(12) United States Patent
Hirzallah et al.

(10) Patent No.: US 12,255,720 B2
(45) Date of Patent: *Mar. 18, 2025

(54) DIRECTIONAL CHANNEL ACCESS USING A NARROW BEAM WITH MULTIPLE SPATIAL STREAMS

(71) Applicant: QUALCOMM Incorporated, San Diego, CA (US)

(72) Inventors: Mohammed Ali Mohammed Hirzallah, San Marcos, CA (US); Arumugam Chendamarai Kannan, San Diego, CA (US); Srinivas Yerramalli, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,692

(22) Filed: Nov. 21, 2023

(65) Prior Publication Data

US 2024/0088979 A1    Mar. 14, 2024

Related U.S. Application Data

(63) Continuation of application No. 17/477,349, filed on Sep. 16, 2021, now Pat. No. 11,863,276.

(51) Int. Cl.
*H04B 7/06* (2006.01)
*H04B 7/0426* (2017.01)
*H04B 17/10* (2015.01)

(52) U.S. Cl.
CPC ........... *H04B 7/0695* (2013.01); *H04B 7/043* (2013.01); *H04B 7/0639* (2013.01); *H04B 17/101* (2015.01)

(58) Field of Classification Search
CPC ...... H04B 7/0695; H04B 17/101; H04B 7/06; H04B 7/08; H04B 17/382; H04W 7/043;
(Continued)

(56) References Cited

U.S. PATENT DOCUMENTS

2019/0132040 A1*   5/2019   Bai ................... H04B 7/088
2019/0222275 A1*   7/2019   Mo .................... H04B 7/0482
(Continued)

OTHER PUBLICATIONS

International Search Report and Written Opinion—PCT/US2022/075078—ISA/EPO—Nov. 21, 2022.

*Primary Examiner* — Mewale A Ambaye
(74) *Attorney, Agent, or Firm* — Holland & Hart LLP/Qualcomm

(57) ABSTRACT

Methods, systems, and devices for wireless communication are described. Aspects of the disclosure describe narrow beam-based channel access that enables a device to communicate in a shared radio frequency spectrum band without performing channel access procedures. Specifically, aspects of the disclosure describe techniques for defining one or more directional beams as a narrow beam, where the relative narrowness of the beam may be determined in the context of interference (e.g., as opposed to being defined from a geometric perspective). For example, a particular beam may be determined to be a narrow beam, and therefore associated with communications in shared radio frequency spectrum bands without channel access procedures, based on one or more metrics and a number of spatial streams associated with the beam. A device may use such narrow beams for communications without channel access procedures in shared radio frequency spectrum bands.

20 Claims, 16 Drawing Sheets

(58) Field of Classification Search
CPC ............... H04W 7/0639; H04W 74/08; H04W 74/0808; H04W 16/14; H04W 16/28
See application file for complete search history.

(56) References Cited

U.S. PATENT DOCUMENTS

| | | | |
|---|---|---|---|
| 2020/0022000 A1* | 1/2020 | Venugopal | H04B 7/088 |
| 2020/0245157 A1* | 7/2020 | Chande | H04W 74/0833 |
| 2021/0251002 A1* | 8/2021 | Sun | H04W 74/0808 |
| 2023/0085595 A1 | 3/2023 | Hirzallah et al. | |
| 2024/0137256 A1* | 4/2024 | Duan | H04J 13/004 |
| 2024/0204842 A1* | 6/2024 | Nattha | H04B 7/0658 |
| 2024/0284522 A1* | 8/2024 | Dutta | H04W 76/10 |

* cited by examiner

DIRECTIONAL CHANNEL ACCESS USING A NARROW BEAM WITH MULTIPLE SPATIAL STREAMS

CROSS REFERENCE

The present application for patent is a continuation of U.S. patent application Ser. No. 17/477,349 by HIRZALLAH et al., entitled "DIRECTIONAL CHANNEL ACCESS USING A NRROW BEAM WITH MULTIPLE SPATIAL STREAMS," filed Sep. 16, 2021, assigned to the assignee hereof, and expressly incorporated by reference herein.

FIELD OF TECHNOLOGY

The following relates to wireless communication, including directional channel access using a narrow beam with multiple spatial streams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications in shared radio frequency spectrum bands (e.g., unlicensed radio frequency spectrum bands). For example, wireless communications in millimeter wave (mmW) and sub-terahertz (THz) frequencies may support a number of shared radio frequency spectrum bands for directional communications between devices. To mitigate interference by multiple devices, channel access procedures (e.g., listen-before-talk (LBT), long-term (LT) sensing) may be performed to determine whether a channel is clear prior to transmitting a message to another device. Such channel access techniques, however, may result in latency or other inefficiencies, particularly when a device may communicate without causing interference to other devices.

SUMMARY

The described techniques relate to improved methods, systems, devices, and apparatuses that support directional channel access using a narrow beam with multiple spatial streams. Generally, the described techniques provide for narrow beam-based channel access that enables a device to communicate in a shared radio frequency spectrum band without performing channel access procedures (e.g., listen-before-talk (LBT), long-term (LT) sensing, or the like). Specifically, aspects of the disclosure may provide techniques for determining that a particular directional beam may be defined as a "narrow beam," where the relative narrowness of the beam may be determined in the context of potential interference to other devices as a result of transmissions using that beam (as opposed to being defined from a geometric perspective). In cases where a beam is determined to be a narrow beam, a device (e.g., a user equipment (UE)) may communicate using the beam on a shared radio frequency band without performing channel access procedures (e.g., prior to transmitting). For example, a particular beam may be determined to be relatively narrow based on one or more measurement values and based on a number of spatial streams associated with the beam. The device may use such narrow beams for communications without channel access procedures in shared radio frequency spectrum bands, thereby enhancing communications efficiency while avoiding unnecessary interference to other devices (e.g., because of the narrowness of the beam used).

A method for wireless communication at a first wireless device is described. The method may include selecting a directional beam from a set of one or more directional beams for transmitting a message to a second wireless device in a shared radio frequency spectrum band, determining that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and transmitting, to the second wireless device, the message in the shared radio frequency spectrum band using the directional beam based on the determination.

An apparatus for wireless communication at a first wireless device is described. The apparatus may include a processor, memory coupled with the processor, and instructions stored in the memory. The instructions may be executable by the processor to cause the apparatus to select a directional beam from a set of one or more directional beams for transmitting a message to a second wireless device in a shared radio frequency spectrum band, determine that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and transmit, to the second wireless device, the message in the shared radio frequency spectrum band using the directional beam based on the determination.

Another apparatus for wireless communication at a first wireless device is described. The apparatus may include means for selecting a directional beam from a set of one or more directional beams for transmitting a message to a second wireless device in a shared radio frequency spectrum band, means for determining that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and means for transmitting, to the second wireless device, the message in the shared radio frequency spectrum band using the directional beam based on the determination.

A non-transitory computer-readable medium storing code for wireless communication at a first wireless device is described. The code may include instructions executable by a processor to select a directional beam from a set of one or more directional beams for transmitting a message to a second wireless device in a shared radio frequency spectrum band, determine that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and transmit, to the second wireless device, the message in the shared radio frequency spectrum band using the directional beam based on the determination.

A method for wireless communication at a first wireless device is described. The method may include selecting a directional beam from a set of one or more directional beams for receiving a message from a second wireless device in a shared radio frequency spectrum band, determining that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and receiving, from the second wireless device, the message in the shared radio frequency spectrum band using the directional beam based on the determination.

An apparatus for wireless communication at a first wireless device is described. The apparatus may include a processor, memory coupled with the processor, and instructions stored in the memory. The instructions may be executable by the processor to cause the apparatus to select a directional beam from a set of one or more directional beams for receiving a message from a second wireless device in a shared radio frequency spectrum band, determine that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and receive, from the second wireless device, the message in the shared radio frequency spectrum band using the directional beam based on the determination.

Another apparatus for wireless communication at a first wireless device is described. The apparatus may include means for selecting a directional beam from a set of one or more directional beams for receiving a message from a second wireless device in a shared radio frequency spectrum band, means for determining that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and means for receiving, from the second wireless device, the message in the shared radio frequency spectrum band using the directional beam based on the determination.

A non-transitory computer-readable medium storing code for wireless communication at a first wireless device is described. The code may include instructions executable by a processor to select a directional beam from a set of one or more directional beams for receiving a message from a second wireless device in a shared radio frequency spectrum band, determine that the directional beam is associated with communications in the shared radio frequency spectrum band that exclude a defined set of channel access procedures, where the determination is based on a number of spatial streams associated with the directional beam and one or more metrics for the directional beam satisfying one or more effective isotropic radiated power thresholds, and receive, from the second wireless device, the message in the shared radio frequency spectrum band using the directional beam based on the determination.

DETAILED DESCRIPTION

Figure 1:
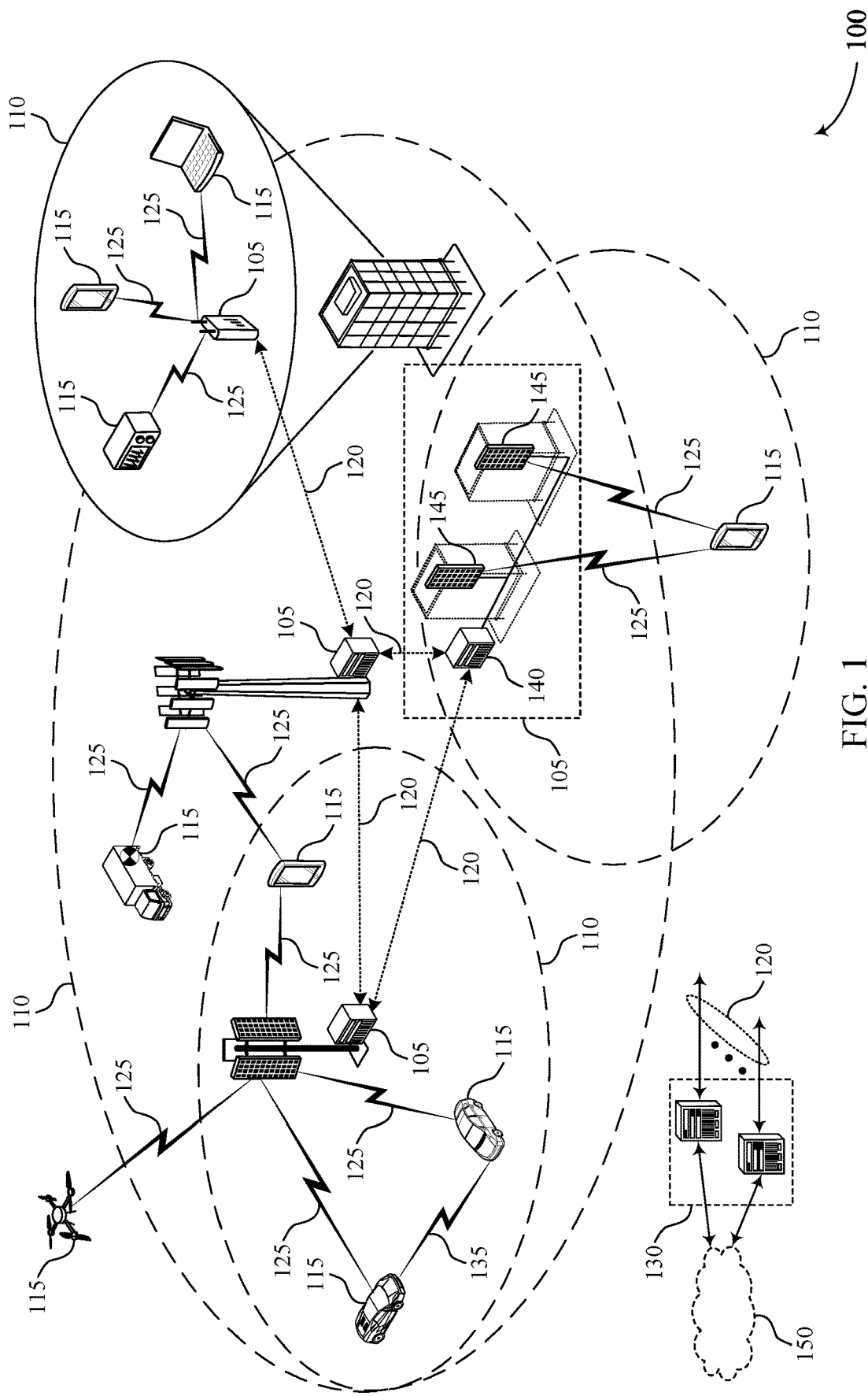
FIG. 1 illustrates an example of a wireless communications system that supports directional channel access using a narrow beam with multiple spatial streams in accordance with aspects of the present disclosure.

Some wireless communications systems may support communications in shared radio frequency spectrum bands (e.g., unlicensed radio frequency bands). For example, wireless communications in millimeter wave (mmW) and subterahertz (THz) frequencies may support a number of shared radio frequency bands for communications between devices. Transmission and reception of wireless signals over these bands, may be directional (e.g., using directional beamforming techniques).

To mitigate interference by multiple devices communicating in unlicensed radio frequency spectrum bands, channel access procedures (e.g., listen-before-talk (LBT), long-term (LT) sensing, or the like) may be performed to determine whether a channel is clear prior to transmitting a message to another device in shared radio frequency spectrum bands. Additionally or alternatively, the message may be transmitted over a particular directional beam that may support reduced interference to one or more unintended receivers in the system. For instance, one or more devices that are nearby (e.g., in relatively close proximity to) an intended receiver may unintentionally receive some portion of a directional transmission to the intended receiver, thereby causing interference. As such, some beamforming techniques may instead be used to form relatively narrow beams that may reduce or minimize interference to nearby devices.

In some cases, it may be beneficial to communicate with another device in the shared radio frequency spectrum band without performing channel access procedures (e.g., to reduce latency), but such techniques may only be performed by a device only if some minimum antenna gain requirements are satisfied, for example, to avoid interference to other devices when skipping channel access procedures. As such, it may be beneficial to define beams that may be used for communications in shared radio frequency bands without using channel access procedures.

As described herein, techniques may be used for determining which beams may be used for shared radio frequency spectrum communications without first performing channel access procedures. Specifically, aspects of the present disclosure provide definitions for narrow beam-based channel access that enables a device to communicate in a shared radio frequency spectrum band (e.g., unlicensed radio frequency spectrum band) without performing channel access procedures. For example, a particular beam may be determined to be relatively narrow based on one or more measurement values, metrics derived from the one or more measurement values, thresholds, a number of spatial streams associated with the beam, or any combination thereof.

In some aspects, the narrowness of a beam may be determined by a per-beam spherical measurement test. The spherical measurement test may be based on forming multiple beams each having a single spatial stream, and measuring effective isotropic radiated power (EIRP) values for various directions of the beams. Additionally or alternatively, the beams may be formed using multiple reference precoders (e.g., that may be from a predefined set of reference precoders) for the spherical measurement test, and the EIRP measurements may be recorded for each beam and each reference precoder. That is, the per-beam spherical measurement test may be performed on a number of beams each associated with a number of spatial streams.

In any case, a particular beam may be associated with a set of EIRP measurement values obtained via the spherical measurement test, and one or more metrics may be identified based on the set of EIRP values for the directional beam. The one or more metrics may then be compared to one or more EIRP threshold values (e.g., based on a cumulative distribution function (CDF) for a set of EIRP values) to determine whether the beam may be used to communicate in the shared radio frequency spectrum band without performing channel access procedures. For instance, if the metrics satisfy at least one EIRP threshold based on the number of spatial streams of the beam, then device may use the beam for transmitting or receiving messages in the shared radio frequency spectrum band while skipping channel access procedures (e.g., LBT, LT sensing).

Particular aspects of the subject matter described herein may be implemented to realize one or more advantages. For example, the described techniques may support definitions of beams that may be used without channel access procedures when communicating in shared radio frequency spectrum bands, such that a device (e.g., a UE) may efficiently identify some beams that enable reduced latency when transmitting messages on that beam. This may result in the device skipping channel access procedures when communicating with another device, while also reducing or minimizing interference to other devices in the system (e.g., based on a relative "narrowness" of the particular beam), which may improve communications efficiency for one or multiple devices. As such, the described techniques may promote device and system efficiencies, enhanced access to a channel, relatively increased data rates, improved spectral efficiency, among other benefits.

Aspects of the disclosure are initially described in the context of wireless communications systems. Aspects of the disclosure are further described by a CDF plot, spherical measurement tests, and a process flow. Aspects of the disclosure are further illustrated by and described with reference to apparatus diagrams, system diagrams, and flowcharts that relate to directional channel access using a narrow beam with multiple spatial streams.

FIG. 1 illustrates an example of a wireless communications system 100 that supports directional channel access using a narrow beam with multiple spatial streams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may utilize relatively high frequency bands (e.g., millimeter wave (mmWave) and sub-THz frequencies) to offer an abundance of shared (e.g., unlicensed) radio frequency spectrum bands to one or more UEs 115. In such cases, transmission and reception over the aforementioned bands may be directional, which may result in an interference-limited wireless environment (e.g., due to the directional nature of the beams, occurrences of interference may be decreased). Depending on an operating scenario associated with some frequency bands (e.g., relatively high frequency bands), a UE 115 performing LBT and/or LT sensing may be avoided, since the directional nature of the beams may reduce the occurrence of interference. In some examples, to resolve potential beam collisions, LBT and LT sensing may be combined with other coexistence methods (e.g., utilizing a narrow beam).

Wireless communications system 100 may support narrow beam-based channel access and associated channel access criteria that are based on statistics of EIRP-based measurements captured in beam-based full-spherical measurements when the UE 115 sends K spatial streams. The relative narrowness of directional beams may be defined in the context of interference (e.g., instead of a geometric context). Aspects of the disclosure may apply to both uplink and downlink channel access, and the definition of a narrow beam may apply to both transmitters and receivers (e.g., the base station 105 and/or the UE 115) in the wireless communications system 100.

In some cases, aspects of the disclosure may provide techniques for determining whether a UE 115 performs LBT in various radio frequency spectrum bands (e.g., a 60 GHz radio frequency spectrum band in accordance with European Telecommunications Standards Institute (ETSI) regulatory requirements, among other radio frequency spectrum bands) in one or more operating modes. For example, operating mode C1 may correspond to a defined, relatively less restrictive (e.g., by device) requirement. Operating mode C1 may be applicable to both mobile and fixed devices, where each device performs LBT to initiate communications with another device. As another example, operating mode C2 may correspond to relatively new and evolving standards applicable to mobile and fixed devices. Notably, in operating mode C2, LBT may be skipped at either the transmitting side or the receiving side with a relatively minimum antenna gain requirement. However, some mitigation techniques may be leveraged in the absence of sufficient antenna gain. As yet another example, operating mode C3 may correspond to an evolving standard applicable to fixed networks (e.g., backhaul). In some cases, C3 may implement automatic transmit power control and link adaptation, which may impact frequency range 2 (FR2) integrated access and backhaul (IAB). Aspects of the present disclosure, while generally applicable to a multitude of operating modes corresponding to wireless communications, may be especially suited for operating mode C2, where the definition of narrow beams, coupled with one or more metrics, may allow one or more UE 115 to perform channel access without performing LBT, LT sensing, or both.

Figure 2:
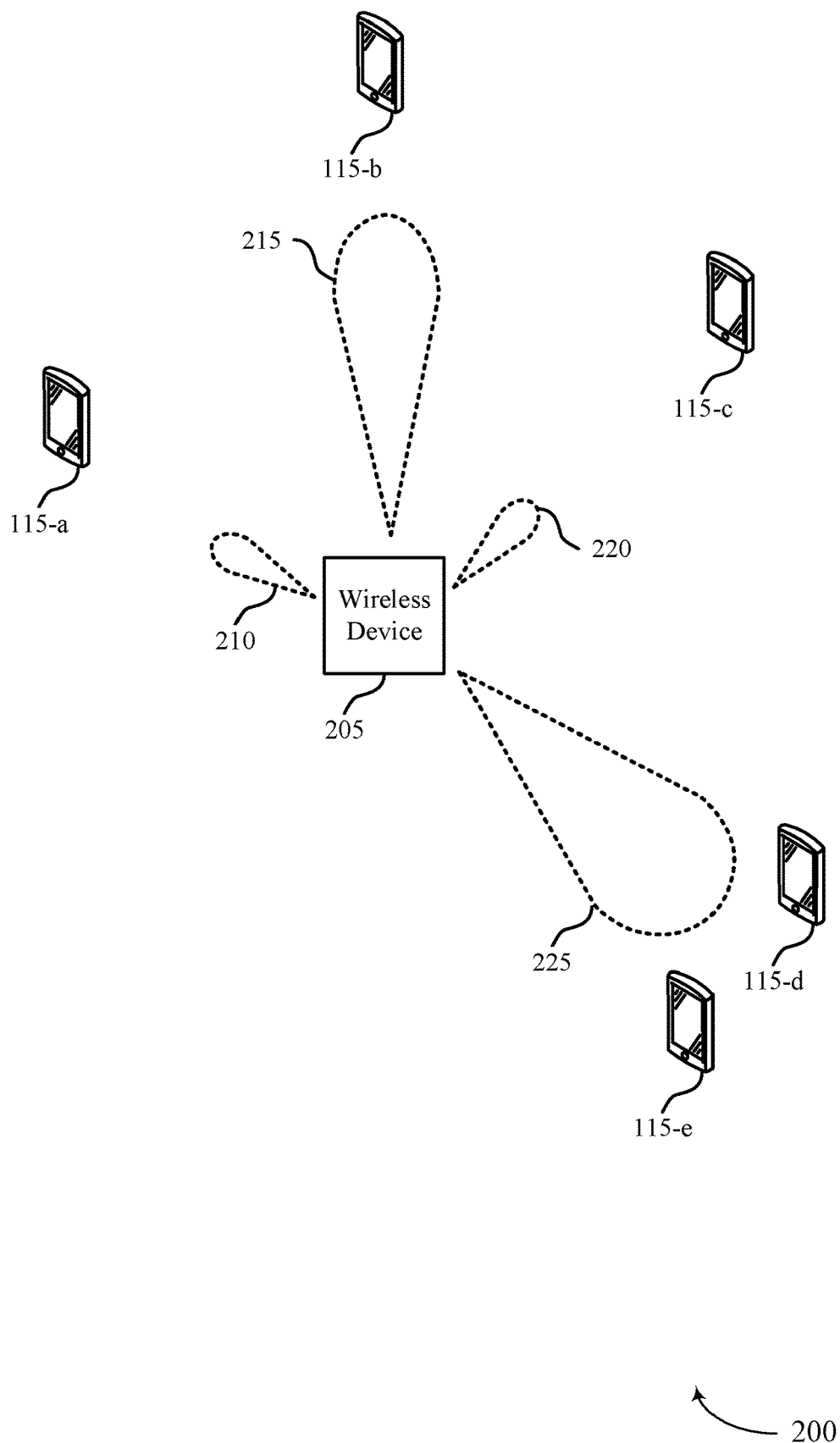
FIG. 2 illustrates an example of a wireless communications system that supports directional channel access using a narrow beam with multiple spatial streams in accordance with aspects of the present disclosure.

FIG. 2 illustrates an example of a wireless communications system 200 that supports directional channel access using a narrow beam with multiple spatial streams in accordance with aspects of the present disclosure. The wireless communications system 200 may include a wireless device 205 (e.g., a base station 105, a UE 115) and UE 115-*a*, UE 115-*b*, UE 115-*c*, UE 115-*d*, and UE 115-*e*, which may each be examples of a UE 115 as described with reference to FIG. 1. While signaling operations may be discussed below as being performed by particular wireless devices, it is important to note that the operations, techniques, and computations may be performed by any number of wireless devices as well as different wireless devices than those discussed below.

The wireless device 205 and the UEs 115-*a*, 115-*b*, 115-*c*, 115-*d*, and 115-*e* may use relatively narrow beams for channel access in accordance with aspects of the present disclosure. Specifically, the wireless device 205 and the UEs 115-*a*, 115-*b*, 115-*c*, 115-*d*, and 115-*e* may specify metrics and criteria for narrow beam channel access based on a number of spatial streams and EIRP measurements (e.g., obtained from one or more spherical measurement tests). In some examples, metrics and criteria for narrow beam channel access may be obtained for a node (e.g., the wireless device 205) sending one spatial stream (e.g., no additional digital precoding). In other examples, metrics and criteria for narrow beam channel access may be obtained for a node sending more than one spatial stream (e.g., including digital precoding). By using the aforementioned metrics and criteria, devices in the wireless communications system 200 may reduce interference at unintended receivers when a transmitter (e.g., base station 105, a UE 115) accesses channels without performing LBT and sends one or more spatial streams within a directional transmission.

For example, FIG. 2 illustrates the wireless device 205 performing one or more directional transmissions to the UEs 115-*a*, 115-*b*, 115-*c*, 115-*d*, and 115-*e*. The wireless device 205 may determine to transmit information over one or more spatial streams to the UE 115-*b* and the UE 115-*d* via directional transmissions utilizing a shared radio frequency spectrum band. In some cases, communications in the shared radio frequency spectrum band used by the wireless device 205, the UE 115-*b*, and the UE 115-*d* may exclude channel access procedures (e.g., based on a number of spatial streams associated with a directional beam). Additionally, the wireless device 205 may determine to transmit using narrow beam definitions based on one or more metrics and criteria in accordance with aspects of the present disclosure.

The wireless device 205 may perform one or more measurements (e.g., EIRP measurements) and metrics to determine that a directional beam 215 is sufficiently narrow to transmit information to the UE 115-*b* without interfering with nearby UEs 115 (e.g., UE 115-*a* and UE 115-*c*). That is, the wireless device 205 may transmit the directional beam 215 such that the directional beam 215 (or a sidelobe 210 and a sidelobe 220) may not interfere with the UEs 115-*a* and 115-*c*. In some examples, the wireless device 205 may utilize different spatial streams within the directional beam 215 to perform single user multiple-input multiple-output (e.g., for SU-MIMO) with the UE 115-*b*. For instance, there may be two different spatial streams within the same directional beam 215 (e.g., for polarization MIMO).

The wireless device 205 may additionally or alternatively perform directional transmissions to the UE 115-*d*. The wireless device 205 may perform similar measurements, along with utilizing similar metrics and thresholds, to determine if a directional beam 225 is a narrow beam such that the directional beam 225 may not interfere with the UE 115-*e*, for example, when the wireless device skips channel access procedures. In some examples, the wireless device 205 may utilize different spatial streams on respective beams (e.g., for SU-MIMO) to support communications with both the UE 115-*d* and the UE 115-*b*. That is, different directional beams (e.g., directional beam 215, directional beam 225) may each include a single spatial stream. In other cases, the wireless device 205 may utilize different spatial streams within a same beam (e.g., for MU-MIMO) to communicate with multiple UEs 115 (e.g., the UE 115-*d* and the UE 115-*b*). In some cases, the wireless device 205 may utilize different spatial streams within multiple directional beams (e.g., for MU-MIMO) to communicate with the UE 115-*d* and the UE 115-*b*. In such examples, one directional beam may include a first spatial stream, a second directional beam may include two or more spatial streams, and a third directional beam may include one or more spatial streams.

In some cases, the metrics and criteria utilized by the wireless device 205 to determine if a directional beam (e.g., directional beam 215, directional beam 225) is a narrow beam may be based on transmissions with a single spatial stream or multiple spatial streams. For example, the wireless device 205 may utilize a spherical measurement test with analog beams utilizing a single spatial stream, where metrics are obtained based on a beam and corresponding EIRP values. In other examples, such as where the wireless device 205 uses multiple spatial streams (e.g., K spatial streams), the wireless device 205 may perform a similar the spherical measurement test to obtain a set of EIRP values while also accounting for precoding parameters (e.g., for a set of reference precoders) corresponding to the K spatial streams. That is, the wireless device 205 may derive metrics based on a directional beam for multiple different directions (e.g., respective directions having an azimuth and elevation), where a spherical measurement test may result in recording corresponding sets of EIRP values for each directional beam. Based on the measurements and metrics obtained for the wireless device 205, the wireless device 205 may compare some metrics to one or more threshold values (e.g., EIRP threshold values, spatial stream thresholds) based on a number of spatial streams associated with a directional beam to determine whether one or more directional beams are a narrow beam (e.g., relative to some amount of interference generated by transmissions using that beam). In some cases, when a directional beam is determined to be a narrow beam in accordance with the aspects described herein, the wireless device 205 may perform directional communication with one or more of the UEs 115-*a*, 115-*b*, 115-*c*, 115-*d*, or 115-*e* without performing channel access procedures (e.g., in a shared radio frequency spectrum band).

Figure 3:
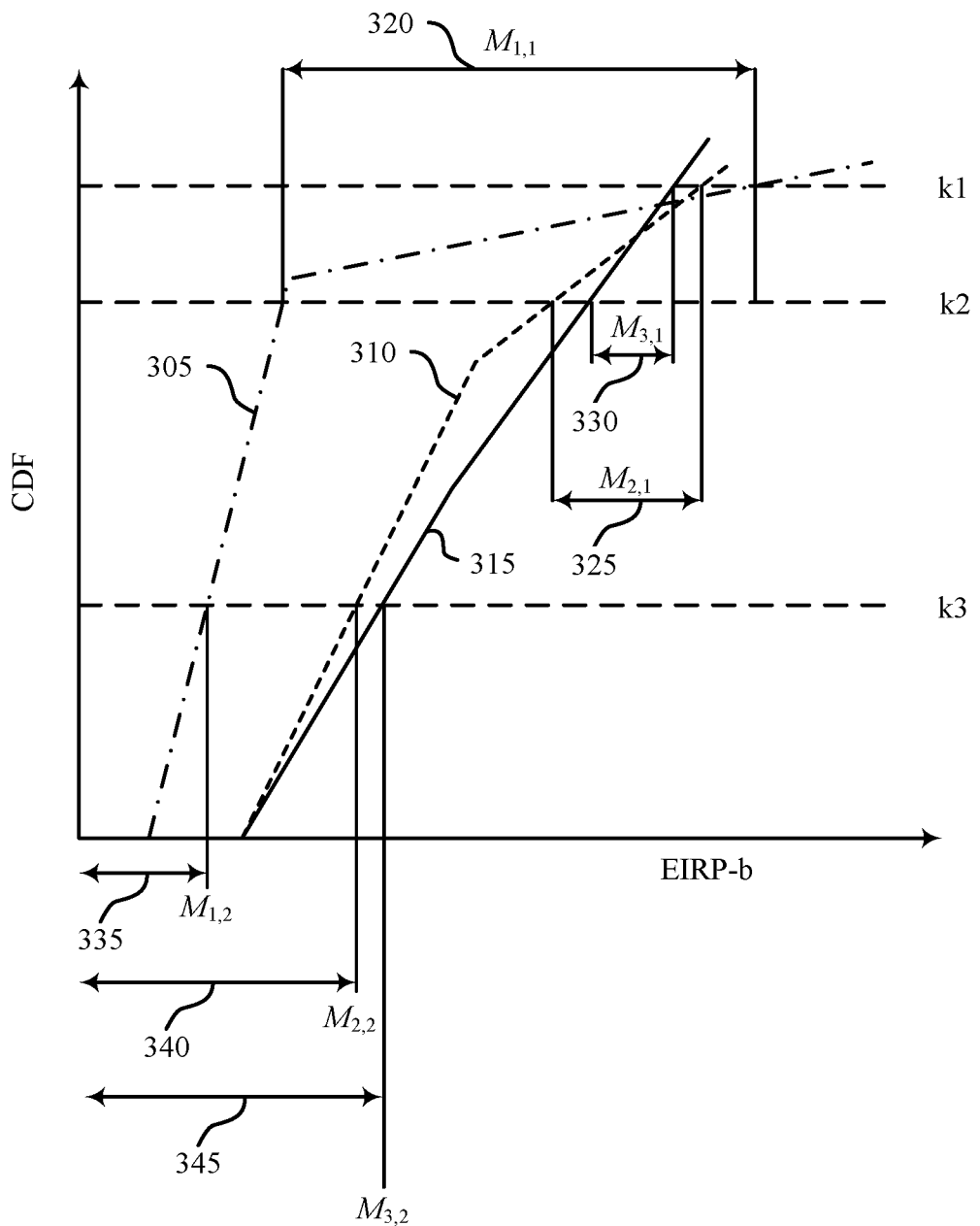
FIG. 3 illustrates an example of a cumulative distribution function plot that supports directional channel access using a narrow beam with multiple spatial streams in accordance with aspects of the present disclosure.

FIG. 3 illustrates an example of a CDF plot 300 that supports directional channel access using a narrow beam with multiple spatial streams in accordance with aspects of the present disclosure. The CDF plot 300 may be used by one or more wireless devices, such as a base station and a UE, which may be examples of a base station 105 and a UE 115 as described with reference to FIG. 1. In some examples, the CDF plot 300 may be associated with one or more operations, signals, and procedures associated with a wireless device, such as a wireless device 205 described with reference to FIG. 2. For example, the CDF plot 300 may be based on one or more spherical measurement tests and a measured set of EIRP values for respective directional beams.

In some examples, such as those described by the present disclosure, a wireless device (e.g., a base station, a UE) may perform one or more measurements and determine one or more metrics in support of performing directional communications such that a directional beam carrying a number of spatial streams is as interference-limited as possible. For example, the wireless device may use a spherical measurement test to record various measurements for one or more directional beams. In some examples, the spherical measurement test may be used to ensure composite beam patterns associated with one or more beams is as wide as possible. In other examples, however, the spherical measurement test may allow definitions for narrow beam criteria (e.g., on a per-beam basis). Here, the spherical measurement test may ensure tested beam patterns, along with any potential analog beamforming with a single spatial stream, is as interference-limited as possible.

In some examples of the spherical measurement test performed on a per-beam bases, for each beam j in B, where B is a set of analog beams (e.g., formed using an analog beamforming codebook) corresponding to a wireless device (e.g., a UE), a spherical measurement test may be performed to obtain measurements, which may in-turn be used to determine a narrowness of a beam in accordance with aspects of the present disclosure (e.g., comparing to one or more thresholds). In some cases, B may correspond to an input to the spherical measurement test. For example, the wireless device may be configured to form a directional beam j (e.g., from a codebook, setting of delay lines, etc.) and use one spatial stream for the spherical measurement test. The spherical measurement test may be conducted, for example, in a far field region to record EIRPs in possible spherical directions $E_j \leftarrow \text{EIRP}_{\phi_i,\theta_i}$, where $E_j$ is the set of EIRPs recorded for beam j. The granularity of EIRP measurements recorded for each beam may be in terms of angular azimuth and elevation (e.g., $\delta\phi$, $\delta\theta$). In some cases, directions of measurements may be decided based on regulatory requirements. Additionally or alternatively, $\delta\phi$, $\delta\theta$ may be uniform or non-uniform, for example, based on regulatory requirements. Each EIRP measurement obtained during the test may be annotated with an azimuth $\phi_i$ and elevation $\theta_i$. Such measurements, along with associated annotations, may be collected in a set of EIRP measurements (e.g., represented by a matrix $\overline{E}$), where the entries of $\overline{E}$ may correspond to directional measurements associated with j directional beams. For example, $\overline{E}$ may be expressed as follows with respect to Equation 1, $$\overline{E} = \{E_1, \ldots, E_j, \ldots, E_B\} \tag{1},$$

where B is the set of analog beams for which measurements are taken to classify a narrowness associated with each beam j in B. Additionally, determining narrowness of a beam with a single spatial stream may be transparent to precoder conditions. As such, the determination of a beam narrowness may depend on a given beam j and associated EIRP values. To elucidate one or more aspects of the disclosure, FIG. 3 serves as an exemplary system where a narrow beam is used for directional transmissions without performing channel access procedures (e.g., LBT, LT sensing). The wireless device may configure different analog beams and conduct spherical measurement tests to characterize radiation patterns associated with the analog beams. Additionally, the measurements may be performed within the context of a maximum transmit power allowed by a regulator (e.g., $P_{max}$). The measurements may be performed to obtain a set of EIRPs (e.g., $E = \{E_1, \ldots, E_j, \ldots, E_N\}$) recorded for N different analog beams (i.e., beam 1, . . . , beam N). Based on the recorded measurements, multiple (e.g., two) metrics may be obtained, where the metrics may be used to determine a narrowness of a beam within the context of interference (e.g., by comparing the metrics to one or more thresholds).

For example, a first metric, $M_{j,1}$, may be associated with a difference in EIRP values corresponding to two different percentiles (e.g., $k_1$, $k_2$) of EIRP measurements for beam j. In one example, $M_{j,1}$ may be expressed as follows, with reference to Equation 2, $$M_{j,1} = k_1 \text{ percentile}(\{EIRP_i - b : i \in E_j\}) - k_2 \text{ percentile}(\{EIRP_i - b : i \in E_j\}) \quad (2)$$

where $E_j$ may be the set of EIRPs capture in spherical measurements for analog beam j, $k_2 < k_1$ (e.g., special case may correspond to $k_1 = 100$ (peak value)), and b may be constant and correspond to $P_{max}$, or another constant value. In some examples, a relatively largest value of $M_{j,1}$ (e.g., largest EIRP projection value) may correspond to the narrowest beam in the set of beams.

As an example, the $M_{j,1}$ metrics may be found via the CDF plot 300 (e.g., representing a CDF vs. EIRP-b plot) to determine a narrowest beam (e.g., in terms of interference associated with that beam), where the EIRP-b may correspond to the dB gain of an antenna array or a device antenna array. For example, the CDF plot 300 illustrates CDFs as a function of EIRP-b for a first beam 305 (e.g., j=1), a second beam 310 (e.g., j=2), and a third beam 315 (e.g., j=3). For each beam j, a plot of CDF vs. EIRP-b may be constructed to determine a first metric, $M_{j,1}$. For example, the metric $M_{1,1}$ 320 may be obtained by finding the projection of the first beam 305 (e.g., j=1) at the $k_1$ percentile (e.g., a range corresponding to an EIRP-b value associated with a $k^{th}$ percentile of all recorded EIRP values for a beam) subtracted by the projection of the first beam 305 on the $k_2$ percentile. Similarly, $M_{2,1}$ 325 and $M_{3,1}$ 330 may be obtained by finding the difference in projections of the second beam 310 on the $k_1$ and $k_2$ percentile and the third beam 315 on the $k_1$ and $k_2$ percentile, respectively. Based on the metrics, it may be determined that the projection corresponding to $M_{1,1}$ 320 (e.g., 10 dB) is larger than $M_{2,1}$ 325 and $M_{3,1}$ 330. The second beam 310 may correspond to high gain in some directions (e.g., relatively higher than the first beam 305. The third beam 315 may correspond to moderate to high gain in most directions (e.g., high possibility of interference). As such, the first beam 305 may be narrower than the second beam 310 and the third beam 315. By utilizing the spherical measurement test, along with the first metric, the wireless device may determine that the first beam 305 is narrow enough to perform directional communications (e.g., by comparing metric $M_{1,1}$ 320 with one or more thresholds) with a second device without performing channel access procedures.

In some cases, a second metric, $M_{j,2}$, may be used to classify the narrowness of beams. For example, a second metric $M_{j,2}$ may be defined as a discounted EIRP value that corresponds to a target percentile (e.g., $k_3$) of EIRP measurements for beam j. $M_{j,2}$ may be expressed as follows, with reference to Equation 3, $$M_{j,2} = k_3 \text{ percentile}(\{EIRP_i - b : i \in E_j\}) \quad (3)$$

where $E_j$ may be the set of EIRPs captured in spherical measurements for analog beam j and b may correspond to $P_{max}$, among other constants. Put another way, $M_{j,2}$ metrics may correspond to projections on a $k^{th}$ percentile (e.g., $k_3$) of multiple EIRP measurements. In this case, a smallest value of $M_{j,2}$ may correspond to the narrowest beam in the set of beams. For example, the metric $M_{1,2}$ 335 may be obtained by finding the projection of the first beam 305 on $k_3$. Similarly, the metric $M_{2,2}$ 340 corresponding to the second beam 310 may be obtained by finding the projection of the second beam 310 on $k_3$. Lastly, the metric $M_{3,2}$ 345 may be obtained by finding the projection of the third beam 315 on $k_3$. As illustrated in FIG. 3, the projection corresponding to $M_{1,2}$ 335 may be the smallest (e.g., compared to $M_{2,2}$ 340 and $M_{3,2}$ 345), which may indicate that the first beam 305 is the narrowest beam. Based on the metrics, the wireless device may determine (e.g., by comparing $M_{1,1}$ 320, or $M_{1,2}$ 335, or both, with one or more thresholds) to use the first beam 305 to perform directional communications without performing channel access procedures.

In some cases, the first metric may be used by the wireless device to determine whether or not to perform directional communications with more than one spatial stream without performing channel access procedures (e.g., based on beam narrowness). Additionally or alternatively, the second metric may be used to determine the narrowness of beams associated with the wireless device, which may enable the wireless device to determine whether to perform directional communications with more than one spatial stream without performing channel access procedures. In some examples, the wireless device may determine if the first metric meets a first condition, if the second metric meets a second condition, or both. If either metric meets an associated condition (e.g., or both meet the conditions), the wireless device may perform directional communications without performing channel access procedures. Otherwise, the wireless device may fall back on one or more channel access procedures (e.g., LBT, LT sensing).

For example, the wireless device may use a first criteria, where the wireless device accesses a channel without performing LBT and sends l spatial streams within beam j if $M_{j,1}$ is greater than a first threshold (e.g., $X_j^{(l)}$), or $M_{j,2}$ is less than a second threshold (e.g., $Z_j^{(l)}$). In some examples, the first threshold $X_j^{(l)}$ and the second threshold $Z_j^{(l)}$ may depend on the number of spatial streams sent. Additionally or alternatively, there may exist different thresholds for different scenarios, which may influence how many spatial streams may be supported based on metrics obtained using a single spatial stream. In some examples, such as in a device-based power limitation scenario, thresholds may be relaxed when the number of spatial streams are increased (e.g., $X_j^{(l_1)} < X_j^{(l_2)}$ and $Z_j^{(l_1)} > Z_j^{(l_2)}$ when $l_1 > l_2$. In other examples, such as for antenna-port-based power limitation scenarios, thresholds may be made more stringent when the number of spatial streams is increased (e.g., $X_j^{(l_1)} > X_j^{(l_2)}$ and $Z_j^{(l_1)} < Z_j^{(l_2)}$ when $l_1 > l_2$).

For example, the wireless device may determine that the first beam 305 is associated with $M_{1,1}$ 320, where $M_{1,1}$ 320 has a value of 10 dB. Additionally, the device may be capable of transmitting up to 4 spatial streams. For a device-based power limitation scenario, one or more thresholds may be determined to be $X_1^{(1)}=12$ dB, $X_1^{(2)}=11$ dB, $X_1^{(3)}=8$ dB, and $X_1^{(4)}=4$ dB. Based on the determined thresholds, the device may access the channel without performing LBT or LT sensing with beam 1 if the device transmits at least 3 or more spatial streams. For an antenna-based power limitation scenario, where $M_{1,1}$ 320 has a value of 10 dB, one or more thresholds may be determined to be $X_1^{(1)}=4$ dB, $X_1^{(2)}=8$ dB, $X_1^{(3)}=11$ dB, and $X_1^{(4)}=12$ dB. In such cases, the device may access the channel without performing LBT or LT sensing with beam 1 if the device sends no more than 2 spatial streams.

In some cases, the wireless device may use a second criteria for device-based power limitation scenarios. A device may access a channel without performing LBT and sends l spatial streams within a beam j if the number of spatial streams (e.g., $l_j$) is greater than a predefined threshold (e.g., $l_{th,1}$). Otherwise, if the number of spatial streams $l_j$ is smaller than a predefined threshold $l_{th,1}$, then the device accesses the channel without LBT using beam j based on the first criteria for device-based power limitation scenarios. For example, $M_{1,1}$ 320 may have a value of 10 dB and $l_{th,1}$ may have a value of 2. The device may send up to 4 spatial streams, where power limitations are specified per device. If the device seeks to access a channel with beam 1 and send 3 spatial streams, then the device accesses the channel without LBT because $l_1=3$ and $l_1 > l_{th,1}$. If the device seeks to access the channel with beam 1 and send two spatial streams, then the device may check to determine if the first criteria is met since $l_1 < l_{th,1}$.

In some other cases, the wireless device may use a third criteria for antenna port-based power limitation scenarios. A device may access a channel without performing LBT and sends l spatial streams within a beam j if the number of spatial streams (e.g., $l_j$) is smaller than a predefined threshold (e.g., $l_{th,j}$). Otherwise, if the number of spatial streams $l_j$ is greater than a predefined threshold $l_{th,j}$, then the device accesses the channel without LBT using beam j based on the first criteria for antenna port-based power limitation scenarios. For example, $M_{1,1}$ 320 may have a value of 10 dB and $l_{th,1}$ may have a value of 3. A device may send up to four spatial streams, where power limitations are specified per antenna port. If the device seeks to access the channel with beam 1 and send four spatial streams, then the device may check the first criteria because $l_1=2$, which is not smaller than $l_{th,1}$. If the device seeks to access the channel with beam 1 and send two spatial streams, then the device may access the channel without LBT because $l_1=2$ and $l_1 < l_{th,1}$.

Figure 4:
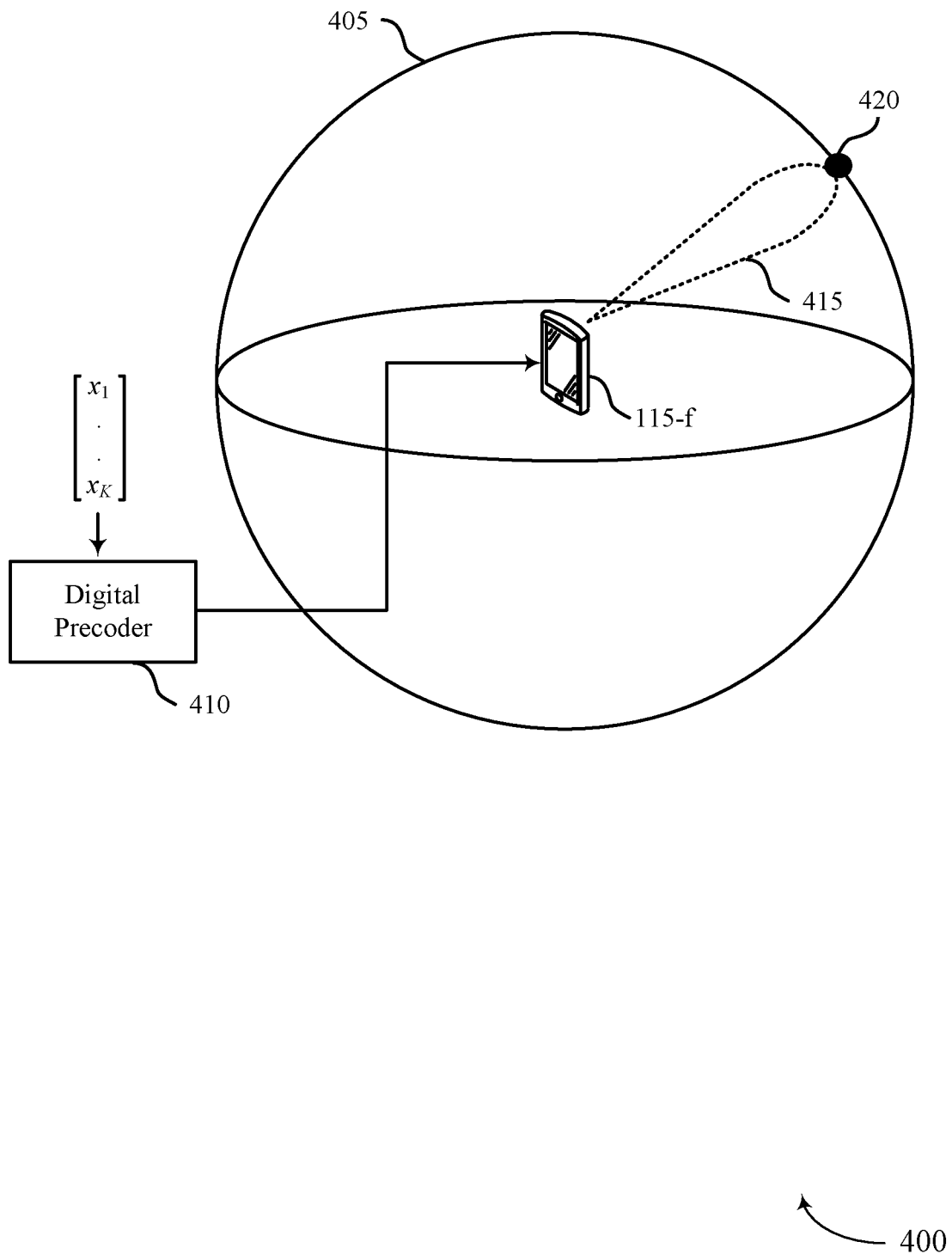
FIG. 4 illustrates an example of a spherical measurement test that supports directional channel access using a narrow beam with multiple spatial streams in accordance with aspects of the present disclosure.

FIG. 4 illustrates an example of a spherical measurement test 400 that supports directional channel access using a narrow beam with multiple spatial streams in accordance with aspects of the present disclosure. The spherical measurement test 400 may be implemented by one or more wireless devices, such as a base station and a UE 115-f, which may be examples of a base station 105 and a UE 115 as described with reference to FIG. 1. In some examples, the spherical measurement test 400 may include one or more operations and procedures associated with the base station 105 and the UE 115-f, which may be examples of those discussed with reference to FIGS. 2 and 3. While specific signaling operations, mathematical techniques, and metrics may be discussed below, the signaling operations between various devices may be performed in a different order than the example order shown, or the operations performed by the devices may be performed by different devices or at different times.

In some examples, the spherical measurement test 400 may be performed with analog beams including K spatial streams (e.g., instead of a single spatial stream). That is, for each beam j in B and precoder l (e.g., corresponding to a digital precoder 410), where B is a set of analog beams (e.g., analog beamforming codebook) corresponding to a UE and $l \in \{1, \ldots, L\}$ is a set of precoders, a spherical measurement test may be performed to obtain measurements, which may in-turn be used to determine if a narrowness of a beam in accordance with aspects of the present disclosure. In such examples, both B and L may correspond to inputs to the spherical measurement test. For example, the UE may be configured to form beam j (e.g., from a codebook, setting of delay lines, etc.) and send K spatial streams with precoder l.

The spherical measurement test 400 may be conducted in a far field region to record EIRPs in possible spherical directions $E_{j,l} \leftarrow EIRP_{\phi,\theta_i}$, where $E_{j,l}$ is the set of EIRPs recorded for beam j and precoder l. The granularity of measurements may be in terms of angular azimuth and elevation (e.g., $\delta\phi$, $\delta\theta$) on a surface of a sphere 405. In some cases, directions of measurements may be decided based on regulatory requirements. Additionally or alternatively, $\delta\phi$, $\delta\theta$ may be uniform or non-uniform, depending on regulatory requirements. Each EIRP measurement may be annotated with its given azimuth $\phi_i$ and elevation $\theta_i$. For example, the UE 115-f may transmit a beam 415 with an associated precoder index. The EIRP value may be obtained at a point 420 on the surface of the sphere 405. Such measurements, along with associated annotations, may be collected in a matrix $\overline{E}$, where the entries of $\overline{E}$ may correspond to directional measurements associated with beam j and precoder l. For example, $\overline{E}$ may be expressed as follows with respect to Equation 4, $$\overline{E} = \{E_{1,1}, \ldots, E_{j,l}, \ldots, E_{B,L}\} \quad (4)$$

In some cases, precoders used in previous EIRP tests can be picked from a reference list of precoders that is specified by regulators or standardization bodies (e.g., 3GPP). Options for constructing the reference list are large, but may be restricted to some based options for the sake of comparison and facilitating beam narrowness tests. For example, one option for a reference list may be composed by choosing an orthonormal matrix $O_{K_{max} \times K_{max}}$ (e.g., a Discrete Fourier Transform (DFT) matrix, and selecting K columns from O to represent a precoder, where $K_{max}$ may be the maximum number of antenna ports and K is the number of spatial streams intended for the EIRP spherical test. Following selecting columns, possible column combinations may be obtained (i.e., $P = K_{max}$ Choose K). From the possible column combinations, a subset of possible combinations may be obtained such that the resultant precoder has a rank of K (i.e., $P < K_{max}$ Choose K), where the rank of each precoder l is K.

It should be noted that the digital precoder or configuration of sending multiple spatial streams in the spherical measurement test 400 may not be accounted for when the wireless device is using single spatial streams (e.g., as in FIG. 3). In the spherical measurement test 400, new metrics and criteria may be defined while specifying EIRP measurements to joint predefined reference digital precoder and analog beam configurations.

The wireless device may configure a beam j and predefined reference precoder 1 (e.g., or a number of spatial streams $N_{SS}$) and conduct the spherical measurement test 400 to obtain EIRPs. The spherical measurement test 400 may be repeated for analog and precoder combinations. The measurements may be performed to obtain a set of EIRPs (e.g., $\bar{E}=\{E_{1,1}, \ldots, E_{N,L}\}$) recorded for N different analog beams (i.e., beam 1, ..., beam N) and predefined precoder configurations using the spherical measurement test 400, where $E_{j,l}$ is a set of EIRPs for an analog beam j and predefined reference precoder 1. Based on the recorded measurements, two metrics may be obtained, where the two metrics may be used to determine a narrowness of a beam within the context of interference.

For example, a first metric $M_{j,1}$ may be defined as a difference in EIRP values corresponding to two different percentiles (e.g., $k_1$, $k_2$) of EIRP measurements for beam j. $M_{j,1}$ may be expressed as follows, with reference to Equation 5, $$M_{j,l,1} = k_1 \text{ percentile}(\{EIRP_i - b : i \in E_{j,l}\}) - k_2 \text{ percentile}(\{EIRP_i - b : i \in E_{j,l}\}) \quad (5)$$

where $E_{j,l}$ may be the set of EIRPs capture in spherical measurements for analog beam j and predefined reference precoder 1, $k_2 < k_1$ (e.g., special case may correspond to $k_1 = 100$ (peak value)), and b may correspond to $P_{max}$, among other constants.

In some cases, a second metric may be used to classify the narrowness of beams. For example, consider a second metric $M_{j,l,2}$ as a discounted EIRP value that corresponds to a target percentile (e.g., $k_1$, $k_2$, $k_3$) of EIRP measurements for beam j and predefined reference precoder 1. $M_{j,l,2}$ may be expressed as follows, with reference to Equation 6, $$M_{j,l,2} = k_3 \text{ percentile}(\{EIRP_i - b : i \in E_{j,l}\}) \quad (6)$$

where $E_{j,l}$ may correspond to a set of EIRPs captured in the spherical measurement test 400 for beam j and precoder 1. In some cases, b may be fixed (e.g., correspond to $P_{max}$).

The spherical measurement test 400 may be used to generate a CDF plot (e.g., CDF vs. EIRP-b, similar to the CDF plot 300) that also accounts for K spatial streams. Similar to the CDF plot 300, one or more metrics may be obtained by projecting the CDF of a given beam and a given precoder on a percentile (e.g., $k_1$, $k_2$, $k_3$). For example, a first beam with a first spatial stream may be projected onto $k_1$ and $k_2$ to obtain a first metric $M_{1,1,1}$, which may correspond to the first metric described above. Similarly, the first beam with a second spatial stream may be projected onto $k_1$ and $k_2$ to obtain a second metric $M_{1,2,1}$. In some cases, $M_{1,1,1}$ may be larger than $M_{1,2,1}$. In such a case, the larger value may indicate the first beam with the first spatial stream is narrower than the first beam with the second spatial stream.

While $M_{1,1,1}$ may correspond to a relatively narrower beam than $M_{1,2,1}$, the wireless device may use one or more criteria or thresholds to determine if a beam is narrow enough to perform directional communications over a channel without performing channel access procedures. For example, a device may use a first criteria to determine if a device passes a narrow beam condition for beam j with a predefined reference precoder 1 if $M_{j,l,1}$ is greater than a predefined threshold (e.g., $X_{j,l}$). Threshold $X_{j,l}$ may be specified based on a device class, a regulatory requirement, or the like.

In some examples, a wireless device may have multiple configuration (e.g., four configuration). For instance, the multiple configurations may include a first configuration of the first beam and a first precoder, a second configuration of the first beam and a second precoder, a third configuration of the second beam and the first precoder, and a fourth configuration of the second beam and the second precoder. Based on the metrics and the one or more thresholds, the first configuration may be associated with a narrowest beam (e.g., having a relatively smallest amount of interference), whereas the second configuration may be associated with a relatively less narrow beam (e.g., compared to the first configuration), followed by the third and fourth configurations. However, other orderings of configurations may be possible, for example, based on the metrics and thresholds used for determining whether a beam may be defined as a narrow beam.

In other examples, the device may use a second criteria, where a device passes the narrow beam condition for beam j with a predefined reference precoder 1 if $M_{j,l,1}$ is greater than a predefined threshold (e.g., $X_{j,l}$) or $M_{j,l,2}$ is less than a threshold (e.g., $Z_{j,l}$). Thresholds $X_{j,l}$ and $Z_{j,l}$ may also be specified based on a device class, a regulatory requirement, and the like. Based on the device passing one or more criteria, the device may access a channel without performing channel access procedures.

Figure 5:
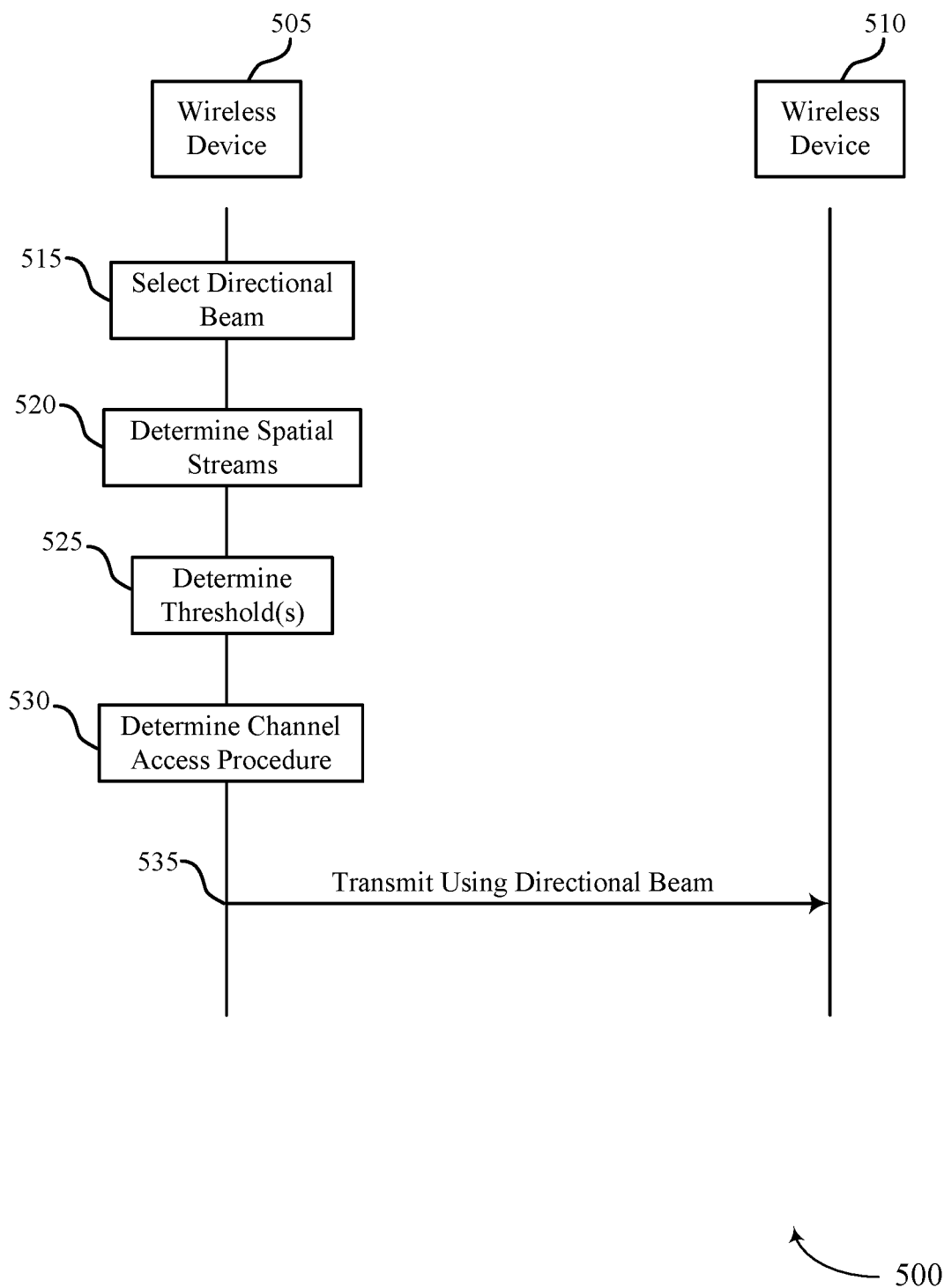
FIG. 5 illustrates an example of a process flow in a system that supports directional channel access using a narrow beam with multiple spatial streams in accordance with aspects of the present disclosure.

FIG. 5 illustrates an example of a process flow 500 in a system that supports directional channel access using a narrow beam with multiple spatial streams in accordance with aspects of the present disclosure. The process flow 500 may be implemented by one or more wireless devices, such as a first wireless device 505 and a second wireless device 510. In some examples, the first wireless device 505, the second wireless device 510, or both, may be an example of a base station or a UE, which may be examples of a base station 105 and a UE 115 as described with reference to FIG. 1. In some examples, the process flow 500 may include one or more operations and procedures associated with the first wireless device 505 and the second wireless device 510, which may be examples of those discussed with reference to FIGS. 2-4. While specific signaling operations, mathematical techniques, and metrics may be discussed below, the signaling operations between various devices may be performed in a different order than the example order shown, or the operations performed by the devices may be performed by different devices or at different times. For instance, the operations performed by the first wireless device 505 may be additionally or alternatively performed by the second wireless device 510, and vice versa.

At 515, the first wireless device 505 may select a directional beam from a set of one or more directional beams for transmitting a message to the second wireless device 510 in a shared radio frequency spectrum band (e.g., in an unlicensed radio frequency spectrum band). In some examples, one or both of the first wireless device 505 or the second wireless device 510 may access a channel in the shared radio frequency band by skipping channel access procedures. For instance, using the techniques described herein, the first wireless device 505 and the second wireless device 510 may communicate with each other without using some defined channel access procedures, such as LBT, LT sensing, or the like, based on a directional beam that qualifies as a narrow beam (e.g., based on a definition of a narrow beam associated with a level of interference).

At 520, the first wireless device 505 may determine a quantity of spatial streams associated with the selected directional beam. For instance, there may be one or more different spatial streams within the same directional beam (e.g., in accordance with SU-MIMO), or there may multiple different spatial streams within the same directional beam (e.g., in accordance with MU-MIMO in cases where the first wireless device 505 is communicating with multiple other wireless devices including the second wireless device 510). In other examples, the selected directional beam may include a first spatial stream and another, different directional beam may include a second spatial stream. In some cases, first wireless device 505 may select multiple directional beams, where each directional beam may include one or more spatial streams. In any case, the number of spatial streams identified by the first wireless device 505 may be used for determining whether the first wireless device 505 may communicate with the second wireless device 510 in the shared radio frequency spectrum band without using channel access procedures.

For example, at 525, the first wireless device 505 may determine one or more threshold values (e.g., threshold EIRP values, a threshold number of spatial streams) for transmitting the message without performing channel access procedures. Here, the first wireless device 505 may use the number of spatial streams, as well as a power limitation scenario (e.g., device-based, antenna-port based) to determine whether one or more thresholds are satisfied. In some examples, one or more thresholds may be based on the number of spatial streams. In an illustrative example, the first wireless device 505 may determine that two spatial streams are used for communicating with the second wireless device 510 over the directional beam and a threshold value (e.g., from a set of threshold values) corresponding to the two spatial streams may be satisfied, thereby enabling the first wireless device 505 to skip channel access procedures before transmitting (e.g., the directional beam may be a "narrow beam"). In another example, the determined number of spatial steams may satisfy some threshold number of spatial streams, then the first wireless device 505 to skip channel access procedures before transmitting based on the satisfied threshold. In some examples, if one threshold is not satisfied based on the number of spatial streams, the first wireless device 505 may fall back to another threshold to determine whether the directional beam is a narrow beam that is associated with skipping channel access procedures. As an example, if the number of spatial streams does not satisfy a spatial stream threshold, an EIRP threshold may be used (e.g., based on a power limitation scenario) to determine that channel access procedures may be skipped.

Thus, at 530, the first wireless device 505 may determine whether a channel access procedure may be skipped or used for communications (e.g., transmitting/receiving messages) using the directional beam in the shared radio frequency spectrum band. Specifically, based on the thresholds, the first wireless device 505 may determine not to perform channel access procedures by leveraging a narrowness associated with the directional beam. In such cases, if the directional beam is determined to be a "narrow beam," then the channel access procedures may be skipped.

In some cases, a spherical measurement test may be used to determine one or more metrics, and the one or more thresholds may be based on the determined metrics. In such cases, the spherical measurement test may be used to record sets of EIRP values for each directional beam of a set of directional beams supported by the first wireless device 505, which may be based on one or more precoders (e.g., a predetermined precoder, a set of reference precoders, or the like).

In some aspects, the second wireless device 510 may perform one or more procedures that are similar or complementary to those described with reference to the first wireless device 505. For example, the second wireless device 510 may select a directional beam (e.g., a receive beam) from a set of one or more directional beams for receiving a message from a first wireless device 505 in the shared radio frequency spectrum band. The second wireless device 510 may determine that the directional beam is associated with communications in the shared radio frequency spectrum band that exclude a defined set of channel access procedures (e.g., that the directional beam is a narrow beam). In such cases, the determination may be based on a number of spatial streams associated with the directional beam and one or more metrics for the directional beam satisfying one or more thresholds (e.g., EIRP thresholds, spatial stream thresholds).

At 535, the first wireless device 505 may transmit, and the second wireless device 510 may receive, the message in the shared radio frequency spectrum band using the directional beam. In cases where the directional beam(s) used by the first wireless device 505 and/or the second wireless device 510 may be defined as a narrow beam using the techniques described herein, then the message may be transmitted and received without performing one or more defined channel access procedures.

Figure 6:
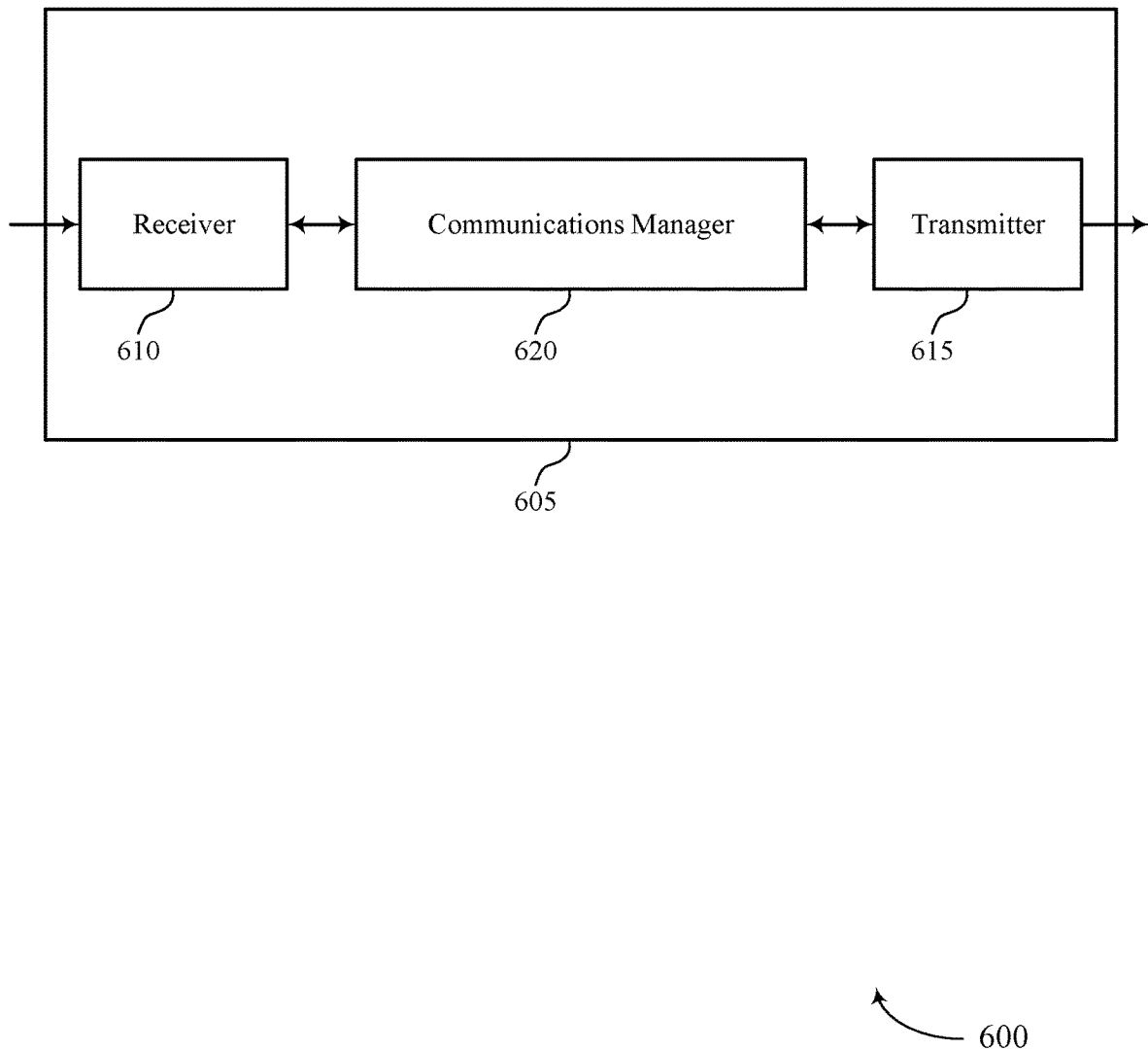
FIGS. 6 and 7 show block diagrams of devices that support directional channel access using a narrow beam with multiple spatial streams in accordance with aspects of the present disclosure.

FIG. 6 shows a block diagram 600 of a device 605 that supports directional channel access using a narrow beam with multiple spatial streams in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to directional channel access using a narrow beam with multiple spatial streams). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to directional channel access using a narrow beam with multiple spatial streams). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of directional channel access using a narrow beam with multiple spatial streams as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. For example, the communications manager 620 may be configured as or otherwise support a means for selecting a directional beam from a set of one or more directional beams for transmitting a message to a second wireless device in a shared radio frequency spectrum band. The communications manager 620 may be configured as or otherwise support a means for determining that the directional beam is associated with communications in the shared radio frequency spectrum band that exclude a defined set of channel access procedures (e.g., LBT procedures, LT procedures, or the like), where the determination is based on a number of spatial streams associated with the directional beam and one or more metrics for the directional beam satisfying one or more EIRP thresholds. The communications manager 620 may be configured as or otherwise support a means for transmitting, to the second wireless device, the message in the shared radio frequency spectrum band using the directional beam based on the determination.

Additionally or alternatively, the communications manager 620 may support wireless communication at a first wireless device in accordance with examples as disclosed herein. For example, the communications manager 620 may be configured as or otherwise support a means for selecting a directional beam from a set of one or more directional beams for receiving a message from a second wireless device in a shared radio frequency spectrum band. The communications manager 620 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The communications manager 620 may be configured as or otherwise support a means for receiving, from the second wireless device, the message in the shared radio frequency spectrum band using the directional beam based on the determination.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and reduced power consumption by avoiding performing channel access procedures. Similarly, the device 605 (e.g., a processor controlling or otherwise coupled to the receiver 610, the transmitter 615, the communications manager 620, or a combination thereof) may support reduced latency and improvements in communications efficiency, throughput, and channel access.

Figure 7:
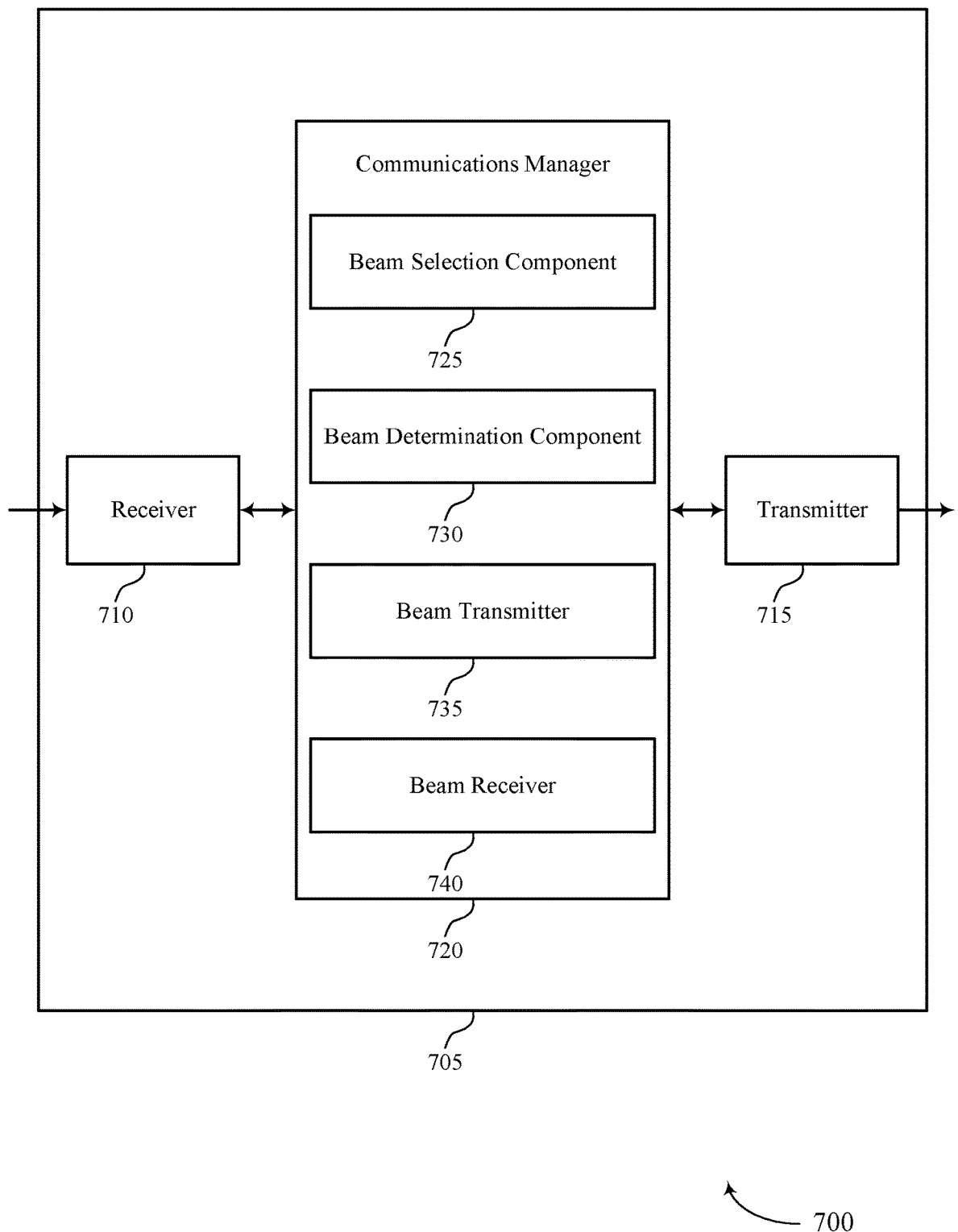

FIG. 7 shows a block diagram 700 of a device 705 that supports directional channel access using a narrow beam with multiple spatial streams in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to directional channel access using a narrow beam with multiple spatial streams). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to directional channel access using a narrow beam with multiple spatial streams). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of directional channel access using a narrow beam with multiple spatial streams as described herein. For example, the communications manager 720 may include a beam selection component 725, a beam determination component 730, a beam transmitter 735, a beam receiver 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first wireless device in accordance with examples as disclosed herein. The beam selection component 725 may be configured as or otherwise support a means for selecting a directional beam from a set of one or more directional beams for transmitting a message to a second wireless device in a shared radio frequency spectrum band. The beam determination component 730 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam transmitter 735 may be configured as or otherwise support a means for transmitting, to the second wireless device, the message in the shared radio frequency spectrum band using the directional beam based on the determination.

Additionally or alternatively, the communications manager 720 may support wireless communication at a first wireless device in accordance with examples as disclosed herein. The beam selection component 725 may be configured as or otherwise support a means for selecting a directional beam from a set of one or more directional beams for receiving a message from a second wireless device in a shared radio frequency spectrum band. The beam determination component 730 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam receiver 740 may be configured as or otherwise support a means for receiving, from the second wireless device, the message in the shared radio frequency spectrum band using the directional beam based on the determination.

Figure 8:
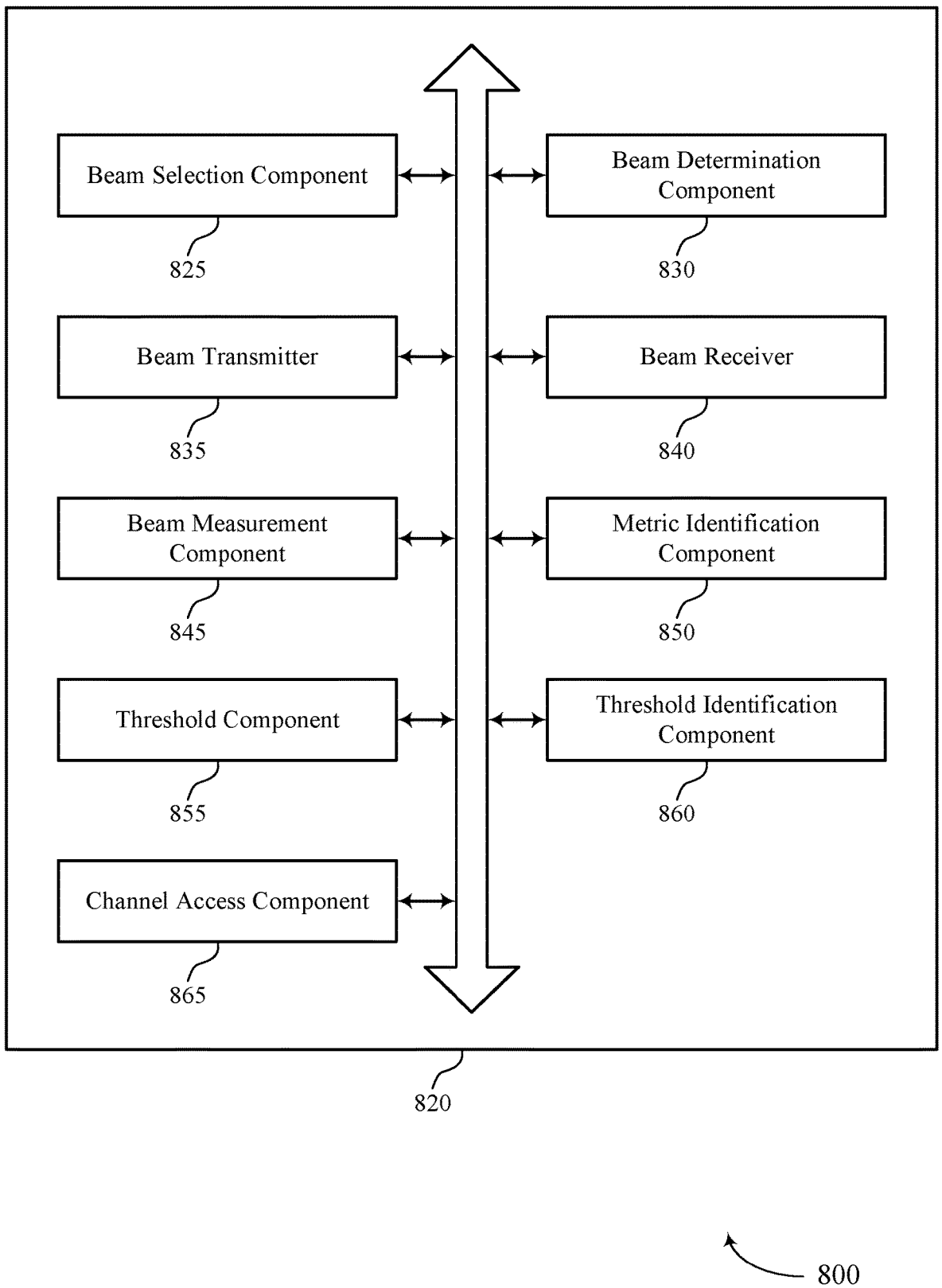
FIG. 8 shows a block diagram of a communications manager that supports directional channel access using a narrow beam with multiple spatial streams in accordance with aspects of the present disclosure.

FIG. 8 shows a block diagram 800 of a communications manager 820 that supports directional channel access using a narrow beam with multiple spatial streams in accordance with aspects of the present disclosure. The communications manager 820 may be an example of aspects of a communications manager 620, a communications manager 720, or both, as described herein. The communications manager 820, or various components thereof, may be an example of means for performing various aspects of directional channel access using a narrow beam with multiple spatial streams as described herein. For example, the communications manager 820 may include a beam selection component 825, a beam determination component 830, a beam transmitter 835, a beam receiver 840, a beam measurement component 845, a metric identification component 850, a threshold component 855, a threshold identification component 860, a channel access component 865, or any combination thereof. Each of these components may communicate, directly or indirectly, with one another (e.g., via one or more buses).

The communications manager 820 may support wireless communication at a first wireless device in accordance with examples as disclosed herein. The beam selection component 825 may be configured as or otherwise support a means for selecting a directional beam from a set of one or more directional beams for transmitting a message to a second wireless device in a shared radio frequency spectrum band. The beam determination component 830 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam transmitter 835 may be configured as or otherwise support a means for transmitting, to the second wireless device, the message in the shared radio frequency spectrum band using the directional beam based on the determination.

In some examples, the beam measurement component 845 may be configured as or otherwise support a means for generating a set of EIRP measurement values for the set of one or more directional beams based on a spherical measurement test for each directional beam of the set of one or more directional beams, where the set of EIRP measurement values includes at least a subset of EIRP measurement values for the directional beam. In some examples, the metric identification component 850 may be configured as or otherwise support a means for identifying the one or more metrics based on the subset of EIRP measurement values for the directional beam. In some examples, the threshold component 855 may be configured as or otherwise support a means for comparing the one or more metrics with the one or more EIRP thresholds based on the number of spatial streams associated with the directional beam, where determining that the directional beam is associated with the communications in the shared radio frequency spectrum band that excludes the defined set of channel access procedures is based on the comparison.

In some examples, to support identifying the one or more metrics for the directional beam, the metric identification component 850 may be configured as or otherwise support a means for identifying a first metric of the one or more metrics based on a difference between a first EIRP measurement value and a second EIRP measurement value from the subset of EIRP measurement values, where the first EIRP measurement value corresponds to a first percentile of EIRP measurements for the directional beam and the second EIRP measurement value corresponds to a second percentile of EIRP measurements for the directional beam.

In some examples, to support determining that the directional beam is associated with the communications in the shared radio frequency spectrum band that excludes the defined set of channel access procedures, the beam determination component 830 may be configured as or otherwise support a means for determining that the directional beam is associated with the communications in the shared radio frequency spectrum band that excludes the defined set of channel access procedures based on the first metric being greater than or equal to at least one EIRP threshold of the one or more EIRP thresholds based on the number of spatial streams.

In some examples, the number of spatial streams does not satisfy a threshold number of spatial streams. In some examples, the first wireless device operates in accordance with a device-based power limitation or an antenna port-based power limitation, or any combination thereof.

In some examples, to support determining that the directional beam is associated with the communications in the shared radio frequency spectrum band that excludes the defined set of channel access procedures, the beam determination component 830 may be configured as or otherwise support a means for determining that the directional beam is associated with the communications in the shared radio frequency spectrum band that excludes the defined set of channel access procedures based on the first metric being greater than a first EIRP threshold of the one or more EIRP thresholds based on the reference precoder. In some examples, the first percentile is greater than the second percentile.

In some examples, to support identifying the one or more metrics for the directional beam, the metric identification component 850 may be configured as or otherwise support a means for identifying a second metric of the one or more metrics based on a third EIRP measurement value that corresponds to a predefined percentile of EIRP measurements for the directional beam.

In some examples, to support determining that the directional beam is associated with the communications in the shared radio frequency spectrum band that excludes the defined set of channel access procedures, the beam determination component 830 may be configured as or otherwise support a means for determining that the directional beam is associated with the communications in the shared radio frequency spectrum band that excludes the defined set of channel access procedures based on the second metric being less than or equal to at least one EIRP threshold of the one or more EIRP thresholds based on the number of spatial streams.

In some examples, the number of spatial streams does not satisfy a threshold number of spatial streams. In some examples, the first wireless device operates in accordance with a device-based power limitation or an antenna port-based power limitation, or any combination thereof.

In some examples, to support determining that the directional beam is associated with the communications in the shared radio frequency spectrum band that excludes the defined set of channel access procedures, the beam determination component 830 may be configured as or otherwise support a means for determining that the directional beam is associated with the communications in the shared radio frequency spectrum band that excludes the defined set of channel access procedures based on the second metric being less than a second EIRP threshold of the one or more EIRP thresholds based on the reference precoder.

In some examples, the second metric is identified based on a transmission power value.

In some examples, to support determining that the directional beam is associated with the communications in the shared radio frequency spectrum band that excludes the defined set of channel access procedures, the threshold identification component 860 may be configured as or otherwise support a means for identifying a threshold number of spatial streams associated with the directional beam. In some examples, to support determining that the directional beam is associated with the communications in the shared radio frequency spectrum band that excludes the defined set of channel access procedures, the threshold component 855 may be configured as or otherwise support a means for comparing the number of spatial streams with the threshold number of spatial streams. In some examples, to support determining that the directional beam is associated with the communications in the shared radio frequency spectrum band that excludes the defined set of channel access procedures, the beam determination component 830 may be configured as or otherwise support a means for determining that the directional beam is associated with the communications in the shared radio frequency spectrum band that excludes the defined set of channel access procedures based on the number of spatial streams satisfying the threshold number of spatial streams.

In some examples, to support performing the spherical measurement test, the beam selection component 825 may be configured as or otherwise support a means for forming each directional beam of the set of one or more directional beams, where each directional beam is formed using a single spatial stream. In some examples, to support performing the spherical measurement test, the beam measurement component 845 may be configured as or otherwise support a means for measuring a set of multiple EIRP measurement values for each directional beam of the set of one or more directional beams, the set of multiple EIRP measurement values including respective EIRP measurement values for each direction of a set of multiple directions. In some examples, to support performing the spherical measurement test, the beam measurement component 845 may be configured as or otherwise support a means for recording the set of EIRP measurement values for the set of one or more directional beams including a subset of EIRP measurement values for each directional beam based on the set of multiple EIRP measurement values.

In some examples, each directional beam of the set of one or more directional beams are formed based on a predetermined beamforming codebook.

In some examples, each direction of the set of multiple directions includes a non-uniform azimuth and a non-uniform elevation. In some examples, each EIRP measurement value of the set of EIRP measurement values is associated with an azimuth value and an elevation value.

In some examples, each direction of the set of multiple directions includes a uniform azimuth and a uniform elevation. In some examples, each EIRP measurement value of the set of EIRP measurement values is associated with an azimuth value and an elevation value.

In some examples, to support performing the spherical measurement test, the beam selection component 825 may be configured as or otherwise support a means for forming each directional beam of the set of one or more directional beams based on a reference precoder from a set of reference precoders, where each directional beam is formed using multiple spatial streams. In some examples, to support performing the spherical measurement test, the beam measurement component 845 may be configured as or otherwise support a means for measuring a set of multiple EIRP measurement values for each directional beam of the set of one or more directional beams and for each reference precoder from the set of reference precoders, the set of multiple EIRP measurement values including respective EIRP measurement values for each direction of a set of multiple directions. In some examples, to support performing the spherical measurement test, the beam measurement component 845 may be configured as or otherwise support a means for recording the set of EIRP measurement values for the set of one or more directional beams including a subset of EIRP measurement values for each directional beam based on the set of multiple EIRP measurement values.

In some examples, each directional beam of the set of one or more directional beams are formed based on a predetermined analog beamforming codebook and a predefined digital precoding codebook.

In some examples, each direction of the set of multiple directions includes a non-uniform azimuth and a non-uniform elevation. In some examples, each EIRP measurement value of the set of EIRP measurement values is associated with an azimuth value and an elevation value.

In some examples, each direction of the set of multiple directions includes a uniform azimuth and a uniform elevation. In some examples, each EIRP measurement value of the set of EIRP measurement values is associated with an azimuth value and an elevation value.

In some examples, the set of reference precoders is based on a number of columns selected from an orthonormal matrix, the number of columns being based on a number of antenna ports and the multiple spatial streams.

In some examples, the threshold identification component 860 may be configured as or otherwise support a means for determining the one or more EIRP thresholds based on the number of spatial streams and one or more parameters associated with a power limitation at the first wireless device.

In some examples, the power limitation includes a device-based power limitation. In some examples, a first EIRP threshold associated with a first number of spatial streams is less than a second EIRP threshold associated with a second number of spatial streams, the first number of spatial streams being greater than the second number of spatial streams.

In some examples, the one or more parameters associated with the power limitation are associated with a device-based power threshold or an antenna port-based power threshold. In some examples, a first EIRP threshold associated with a first number of spatial streams is greater than a second EIRP threshold associated with a second number of spatial streams, the first number of spatial streams being greater than the second number of spatial streams.

In some examples, the channel access component 865 may be configured as or otherwise support a means for refraining from performing the channel access procedures prior to transmitting the message based on determining that the directional beam is associated with the communications in the shared radio frequency spectrum band that excludes the defined set of channel access procedures, the channel access procedures including one or more listen-before-talk procedures.

Additionally or alternatively, the communications manager 820 may support wireless communication at a first wireless device in accordance with examples as disclosed herein. In some examples, the beam selection component 825 may be configured as or otherwise support a means for selecting a directional beam from a set of one or more directional beams for receiving a message from a second wireless device in a shared radio frequency spectrum band. In some examples, the beam determination component 830 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam receiver 840 may be configured as or otherwise support a means for receiving, from the second wireless device, the message in the shared radio frequency spectrum band using the directional beam based on the determination.

In some examples, the beam measurement component 845 may be configured as or otherwise support a means for generating a set of EIRP measurement values for the set of one or more directional beams based on a spherical measurement test for each directional beam of the set of one or more directional beams, where the set of EIRP measurement values includes at least a subset of EIRP measurement values for the directional beam. In some examples, the metric identification component 850 may be configured as or otherwise support a means for identifying the one or more metrics based on the subset of EIRP measurement values for the directional beam. In some examples, the threshold component 855 may be configured as or otherwise support a means for comparing the one or more metrics with the one or more EIRP thresholds based on the number of spatial streams associated with the directional beam, where determining that the directional beam is associated with the communications in the shared radio frequency spectrum band that excludes the defined set of channel access procedures is based on the comparison.

Figure 9:
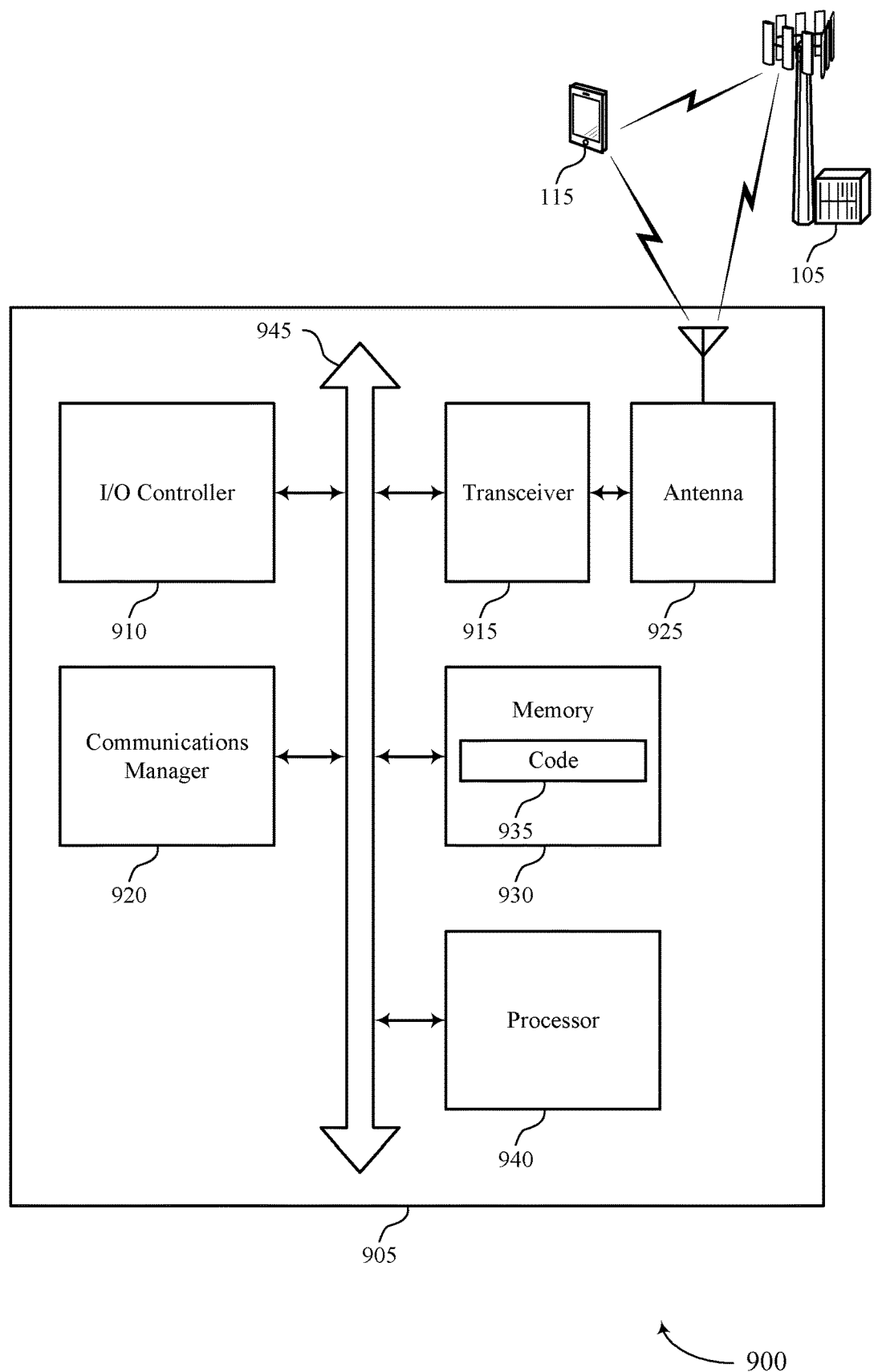
FIG. 9 shows a diagram of a system including a device that supports directional channel access using a narrow beam with multiple spatial streams in accordance with aspects of the present disclosure.

FIG. 9 shows a diagram of a system 900 including a device 905 that supports directional channel access using a narrow beam with multiple spatial streams in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed)

to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting directional channel access using a narrow beam with multiple spatial streams). For example, the device 905 or a component of the device 905 may include a processor 940 and memory 930 coupled to the processor 940, the processor 940 and memory 930 configured to perform various functions described herein.

The communications manager 920 may support wireless communication at a first wireless device in accordance with examples as disclosed herein. For example, the communications manager 920 may be configured as or otherwise support a means for selecting a directional beam from a set of one or more directional beams for transmitting a message to a second wireless device in a shared radio frequency spectrum band. The communications manager 920 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The communications manager 920 may be configured as or otherwise support a means for transmitting, to the second wireless device, the message in the shared radio frequency spectrum band using the directional beam based on the determination.

Additionally or alternatively, the communications manager 920 may support wireless communication at a first wireless device in accordance with examples as disclosed herein. For example, the communications manager 920 may be configured as or otherwise support a means for selecting a directional beam from a set of one or more directional beams for receiving a message from a second wireless device in a shared radio frequency spectrum band. The communications manager 920 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The communications manager 920 may be configured as or otherwise support a means for receiving, from the second wireless device, the message in the shared radio frequency spectrum band using the directional beam based on the determination.

By including or configuring the communications manager 920 in accordance with examples as described herein, the device 905 may support techniques for communication reliability, reduced latency, more efficient utilization of communication resources, improved coordination between devices, and enhanced communications efficiency while avoiding unnecessary interference to other devices when performing directional communication over a channel without performing channel access procedures.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of directional channel access using a narrow beam with multiple spatial streams as described herein, or the processor 940 and the memory 930 may be otherwise configured to perform or support such operations.

Figure 10:
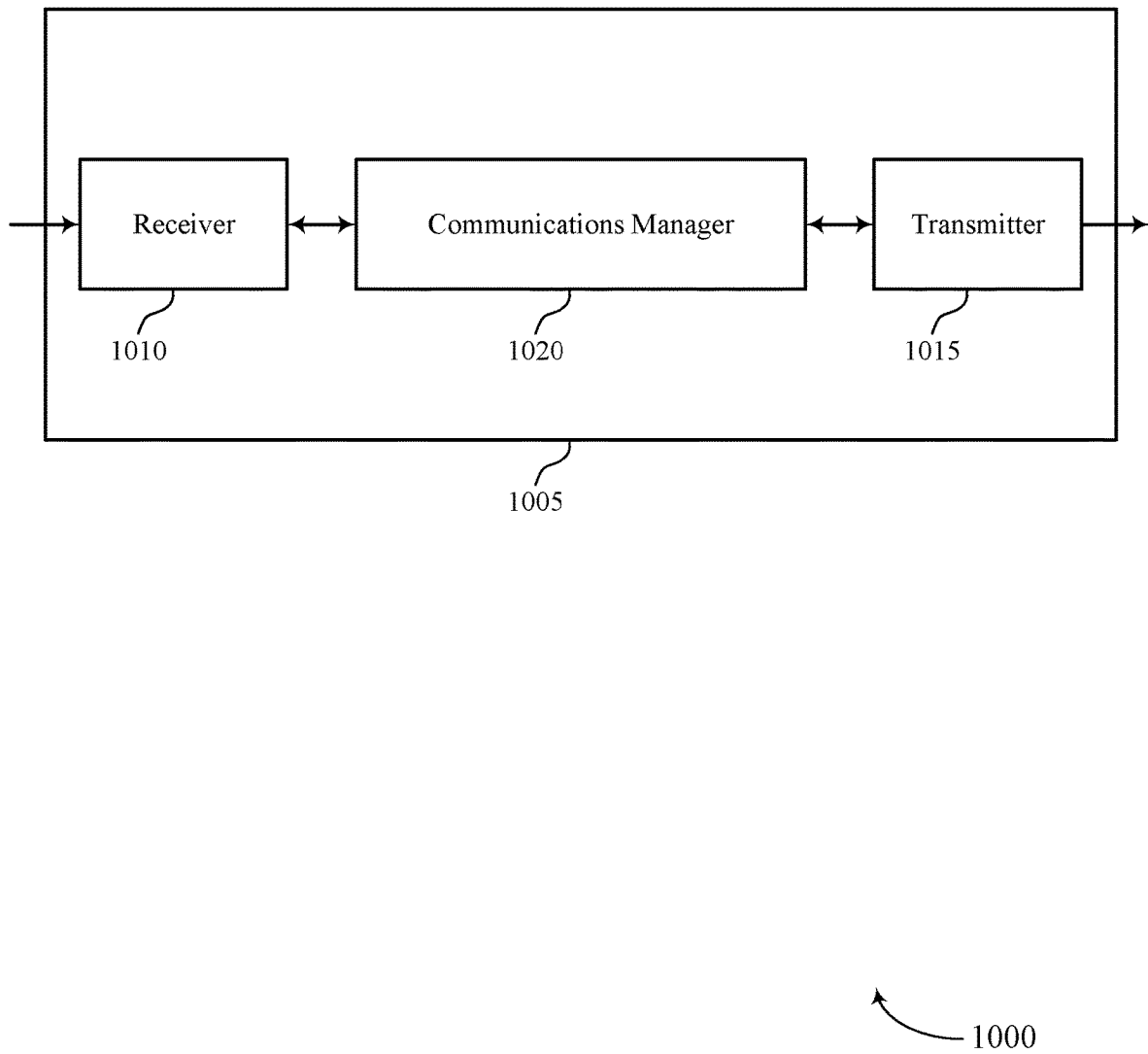
FIGS. 10 and 11 show block diagrams of devices that support directional channel access using a narrow beam with multiple spatial streams in accordance with aspects of the present disclosure.

FIG. 10 shows a block diagram 1000 of a device 1005 that supports directional channel access using a narrow beam with multiple spatial streams in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to directional channel access using a narrow beam with multiple spatial streams). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to directional channel access using a narrow beam with multiple spatial streams). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of directional channel access using a narrow beam with multiple spatial streams as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first wireless device in accordance with examples as disclosed herein. For example, the communications manager 1020 may be configured as or otherwise support a means for selecting a directional beam from a set of one or more directional beams for transmitting a message to a second wireless device in a shared radio frequency spectrum band. The communications manager 1020 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The communications manager 1020 may be configured as or otherwise support a means for transmitting, to the second wireless device, the message in the shared radio frequency spectrum band using the directional beam based on the determination.

Additionally or alternatively, the communications manager 1020 may support wireless communication at a first wireless device in accordance with examples as disclosed herein. For example, the communications manager 1020 may be configured as or otherwise support a means for selecting a directional beam from a set of one or more directional beams for receiving a message from a second wireless device in a shared radio frequency spectrum band. The communications manager 1020 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The communications manager 1020 may be configured as or otherwise support a means for receiving, from the second wireless device, the message in the shared radio frequency spectrum band using the directional beam based on the determination.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and reduced power consumption by avoiding performing channel access procedures.

Figure 11:
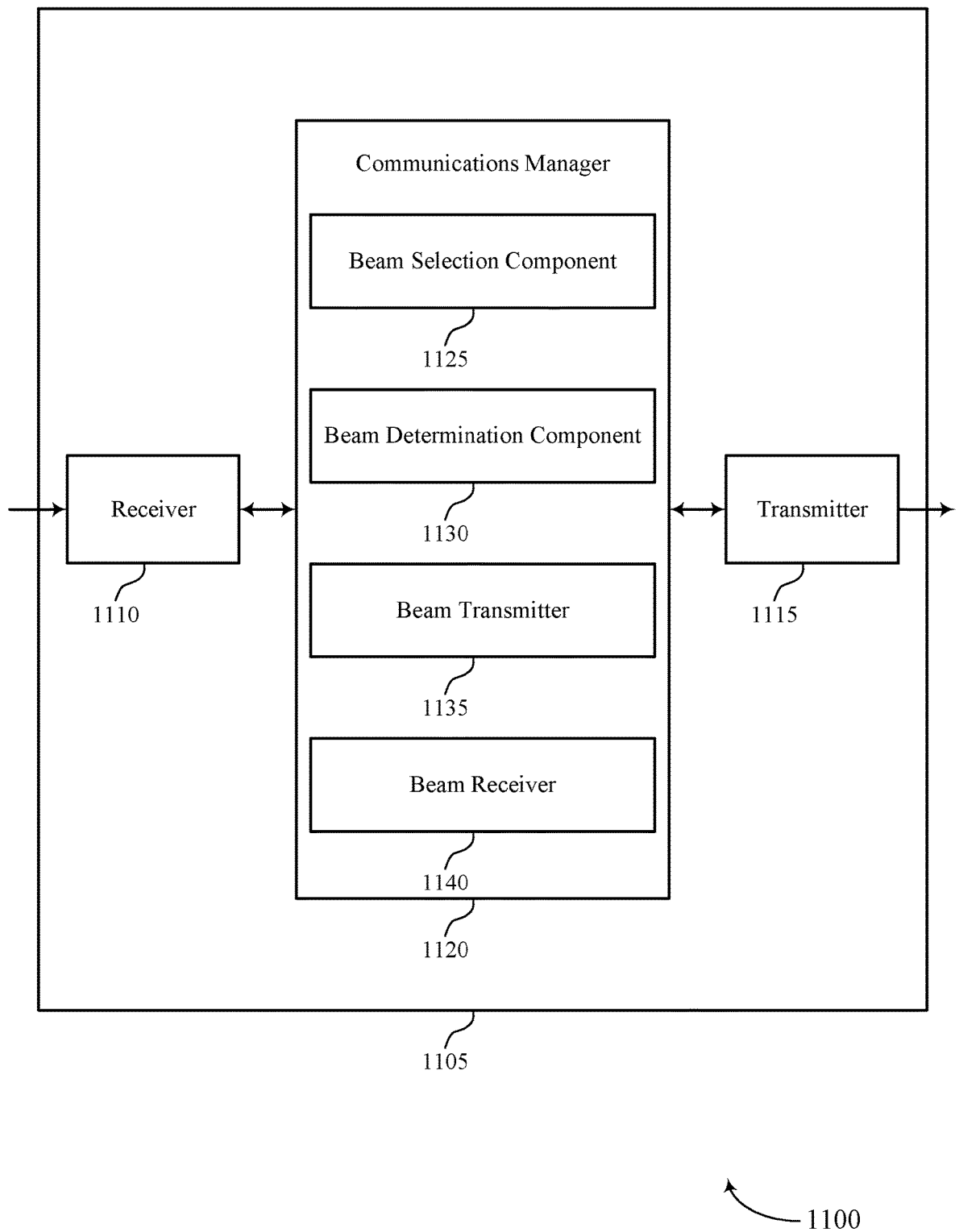

FIG. 11 shows a block diagram 1100 of a device 1105 that supports directional channel access using a narrow beam with multiple spatial streams in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to directional channel access using a narrow beam with multiple spatial streams). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to directional channel access using a narrow beam with multiple spatial streams). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of directional channel access using a narrow beam with multiple spatial streams as described herein. For example, the communications manager 1120 may include a beam selection component 1125, a beam determination component 1130, a beam transmitter 1135, a beam receiver 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first wireless device in accordance with examples as disclosed herein. The beam selection component 1125 may be configured as or otherwise support a means for selecting a directional beam from a set of one or more directional beams for transmitting a message to a second wireless device in a shared radio frequency spectrum band. The beam determination component 1130 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam transmitter 1135 may be configured as or otherwise support a means for transmitting, to the second wireless device, the message in the shared radio frequency spectrum band using the directional beam based on the determination.

Additionally or alternatively, the communications manager 1120 may support wireless communication at a first wireless device in accordance with examples as disclosed herein. The beam selection component 1125 may be configured as or otherwise support a means for selecting a directional beam from a set of one or more directional beams for receiving a message from a second wireless device in a shared radio frequency spectrum band. The beam determination component 1130 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam receiver 1140 may be configured as or otherwise support a means for receiving, from the second wireless device, the message in the shared radio frequency spectrum band using the directional beam based on the determination.

Figure 12:
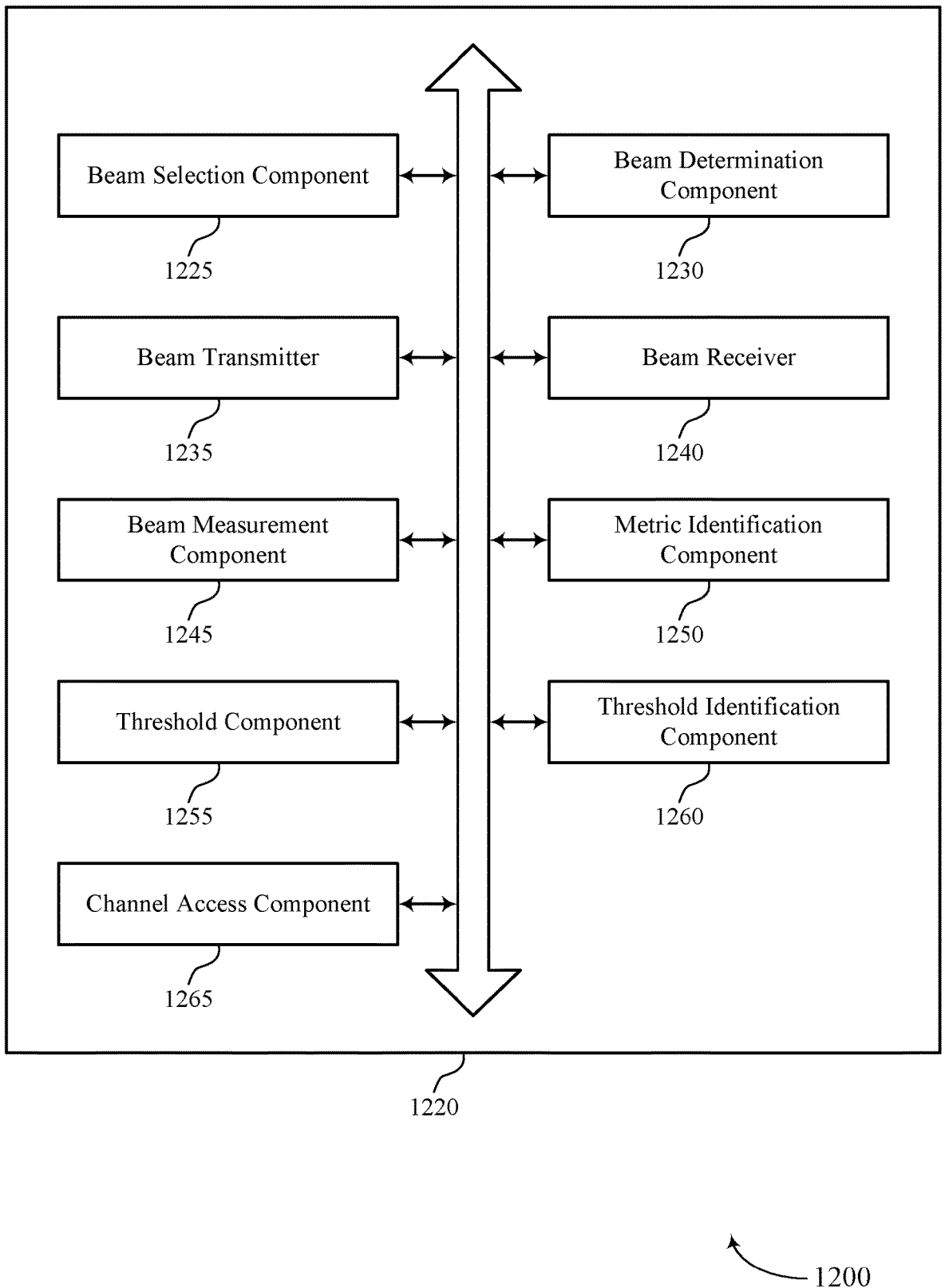
FIG. 12 shows a block diagram of a communications manager that supports directional channel access using a narrow beam with multiple spatial streams in accordance with aspects of the present disclosure.

FIG. 12 shows a block diagram 1200 of a communications manager 1220 that supports directional channel access using a narrow beam with multiple spatial streams in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of directional channel access using a narrow beam with multiple spatial streams as described herein. For example, the communications manager 1220 may include a beam selection component 1225, a beam determination component 1230, a beam transmitter 1235, a beam receiver 1240, a beam measurement component 1245, a metric identification component 1250, a threshold component 1255, a threshold identification component 1260, a channel access component 1265, or any combination thereof. Each of these components may communicate, directly or indirectly, with one another (e.g., via one or more buses).

The communications manager 1220 may support wireless communication at a first wireless device in accordance with examples as disclosed herein. The beam selection component 1225 may be configured as or otherwise support a means for selecting a directional beam from a set of one or more directional beams for transmitting a message to a second wireless device in a shared radio frequency spectrum band. The beam determination component 1230 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam transmitter 1235 may be configured as or otherwise support a means for transmitting, to the second wireless device, the message in the shared radio frequency spectrum band using the directional beam based on the determination.

In some examples, the beam measurement component 1245 may be configured as or otherwise support a means for generating a set of EIRP measurement values for the set of one or more directional beams based on a spherical measurement test for each directional beam of the set of one or more directional beams, where the set of EIRP measurement values includes at least a subset of EIRP measurement values for the directional beam. In some examples, the metric identification component 1250 may be configured as or otherwise support a means for identifying the one or more metrics based on the subset of EIRP measurement values for the directional beam. In some examples, the threshold component 1255 may be configured as or otherwise support a means for comparing the one or more metrics with the one or more EIRP thresholds based on the number of spatial streams associated with the directional beam, where determining that the directional beam is associated with the communications in the shared radio frequency spectrum band that excludes the defined set of channel access procedures is based on the comparison.

In some examples, to support identifying the one or more metrics for the directional beam, the metric identification component 1250 may be configured as or otherwise support a means for identifying a first metric of the one or more metrics based on a difference between a first EIRP measurement value and a second EIRP measurement value from the subset of EIRP measurement values, where the first EIRP measurement value corresponds to a first percentile of EIRP measurements for the directional beam and the second EIRP measurement value corresponds to a second percentile of EIRP measurements for the directional beam.

In some examples, to support determining that the directional beam is associated with the communications in the shared radio frequency spectrum band that excludes the defined set of channel access procedures, the beam determination component 1230 may be configured as or otherwise support a means for determining that the directional beam is associated with the communications in the shared radio frequency spectrum band that excludes the defined set of channel access procedures based on the first metric being greater than or equal to at least one EIRP threshold of the one or more EIRP thresholds based on the number of spatial streams.

In some examples, the number of spatial streams does not satisfy a threshold number of spatial streams. In some examples, the first wireless device operates in accordance with a device-based power limitation or an antenna port-based power limitation, or any combination thereof.

In some examples, to support determining that the directional beam is associated with the communications in the shared radio frequency spectrum band that excludes the defined set of channel access procedures, the beam determination component 1230 may be configured as or otherwise support a means for determining that the directional beam is associated with the communications in the shared radio frequency spectrum band that excludes the defined set of channel access procedures based on the first metric being greater than a first EIRP threshold of the one or more EIRP thresholds based on the reference precoder.

In some examples, the first percentile is greater than the second percentile.

In some examples, to support identifying the one or more metrics for the directional beam, the metric identification component 1250 may be configured as or otherwise support a means for identifying a second metric of the one or more metrics based on a third EIRP measurement value that corresponds to a predefined percentile of EIRP measurements for the directional beam.

In some examples, to support determining that the directional beam is associated with the communications in the shared radio frequency spectrum band that excludes the defined set of channel access procedures, the beam determination component 1230 may be configured as or otherwise support a means for determining that the directional beam is associated with the communications in the shared radio frequency spectrum band that excludes the defined set of channel access procedures based on the second metric being less than or equal to at least one EIRP threshold of the one or more EIRP thresholds based on the number of spatial streams.

In some examples, the number of spatial streams does not satisfy a threshold number of spatial streams. In some examples, the first wireless device operates in accordance with a device-based power limitation or an antenna port-based power limitation, or any combination thereof.

In some examples, to support determining that the directional beam is associated with the communications in the shared radio frequency spectrum band that excludes the defined set of channel access procedures, the beam determination component 1230 may be configured as or otherwise support a means for determining that the directional beam is associated with the communications in the shared radio frequency spectrum band that excludes the defined set of channel access procedures based on the second metric being less than a second EIRP threshold of the one or more EIRP thresholds based on the reference precoder.

In some examples, the second metric is identified based on a transmission power value.

In some examples, to support determining that the directional beam is associated with the communications in the shared radio frequency spectrum band that excludes the defined set of channel access procedures, the threshold identification component 1260 may be configured as or otherwise support a means for identifying a threshold number of spatial streams associated with the directional beam. In some examples, to support determining that the directional beam is associated with the communications in the shared radio frequency spectrum band that excludes the defined set of channel access procedures, the threshold component 1255 may be configured as or otherwise support a means for comparing the number of spatial streams with the threshold number of spatial streams. In some examples, to support determining that the directional beam is associated with the communications in the shared radio frequency spectrum band that excludes the defined set of channel access procedures, the beam determination component 1230 may be configured as or otherwise support a means for determining that the directional beam is associated with the communications in the shared radio frequency spectrum band that excludes the defined set of channel access procedures based on the number of spatial streams satisfying the threshold number of spatial streams.

In some examples, to support performing the spherical measurement test, the beam selection component 1225 may be configured as or otherwise support a means for forming each directional beam of the set of one or more directional beams, where each directional beam is formed using a single spatial stream. In some examples, to support performing the spherical measurement test, the beam measurement component 1245 may be configured as or otherwise support a means for measuring a set of multiple EIRP measurement values for each directional beam of the set of one or more directional beams, the set of multiple EIRP measurement values including respective EIRP measurement values for each direction of a set of multiple directions. In some examples, to support performing the spherical measurement test, the beam measurement component 1245 may be configured as or otherwise support a means for recording the set of EIRP measurement values for the set of one or more directional beams including a subset of EIRP measurement values for each directional beam based on the set of multiple EIRP measurement values.

In some examples, each directional beam of the set of one or more directional beams are formed based on a predetermined beamforming codebook.

In some examples, each direction of the set of multiple directions includes a non-uniform azimuth and a non-uniform elevation. In some examples, each EIRP measurement value of the set of EIRP measurement values is associated with an azimuth value and an elevation value.

In some examples, each direction of the set of multiple directions includes a uniform azimuth and a uniform elevation. In some examples, each EIRP measurement value of the set of EIRP measurement values is associated with an azimuth value and an elevation value.

In some examples, to support performing the spherical measurement test, the beam selection component 1225 may be configured as or otherwise support a means for forming each directional beam of the set of one or more directional beams based on a reference precoder from a set of reference precoders, where each directional beam is formed using multiple spatial streams. In some examples, to support performing the spherical measurement test, the beam measurement component 1245 may be configured as or otherwise support a means for measuring a set of multiple EIRP measurement values for each directional beam of the set of one or more directional beams and for each reference precoder from the set of reference precoders, the set of multiple EIRP measurement values including respective EIRP measurement values for each direction of a set of multiple directions. In some examples, to support performing the spherical measurement test, the beam measurement component 1245 may be configured as or otherwise support a means for recording the set of EIRP measurement values for the set of one or more directional beams including a subset of EIRP measurement values for each directional beam based on the set of multiple EIRP measurement values.

In some examples, each directional beam of the set of one or more directional beams are formed based on a predetermined analog beamforming codebook and a predefined digital precoding codebook.

In some examples, each direction of the set of multiple directions includes a non-uniform azimuth and a non-uniform elevation. In some examples, each EIRP measurement value of the set of EIRP measurement values is associated with an azimuth value and an elevation value.

In some examples, each direction of the set of multiple directions includes a uniform azimuth and a uniform elevation. In some examples, each EIRP measurement value of the set of EIRP measurement values is associated with an azimuth value and an elevation value.

In some examples, the set of reference precoders is based on a number of columns selected from an orthonormal matrix, the number of columns being based on a number of antenna ports and the multiple spatial streams.

In some examples, the threshold identification component 1260 may be configured as or otherwise support a means for determining the one or more EIRP thresholds based on the number of spatial streams and one or more parameters associated with a power limitation at the first wireless device.

In some examples, the power limitation includes a device-based power limitation. In some examples, a first EIRP threshold associated with a first number of spatial streams is less than a second EIRP threshold associated with a second number of spatial streams, the first number of spatial streams being greater than the second number of spatial streams.

In some examples, the one or more parameters associated with the power limitation are associated with a device-based power threshold or an antenna port-based power threshold. In some examples, a first EIRP threshold associated with a first number of spatial streams is greater than a second EIRP threshold associated with a second number of spatial streams, the first number of spatial streams being greater than the second number of spatial streams.

In some examples, the channel access component 1265 may be configured as or otherwise support a means for refraining from performing the channel access procedures prior to transmitting the message based on determining that the directional beam is associated with the communications in the shared radio frequency spectrum band that excludes the defined set of channel access procedures, the channel access procedures including one or more listen-before-talk procedures.

Additionally or alternatively, the communications manager 1220 may support wireless communication at a first wireless device in accordance with examples as disclosed herein. In some examples, the beam selection component 1225 may be configured as or otherwise support a means for selecting a directional beam from a set of one or more directional beams for receiving a message from a second wireless device in a shared radio frequency spectrum band. In some examples, the beam determination component 1230 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The beam receiver 1240 may be configured as or otherwise support a means for receiving, from the second wireless device, the message in the shared radio frequency spectrum band using the directional beam based on the determination.

In some examples, the beam measurement component 1245 may be configured as or otherwise support a means for generating a set of EIRP measurement values for the set of one or more directional beams based on a spherical measurement test for each directional beam of the set of one or more directional beams, where the set of EIRP measurement values includes at least a subset of EIRP measurement values for the directional beam. In some examples, the metric identification component 1250 may be configured as or otherwise support a means for identifying the one or more metrics based on the subset of EIRP measurement values for the directional beam. In some examples, the threshold component 1255 may be configured as or otherwise support a means for comparing the one or more metrics with the one or more EIRP thresholds based on the number of spatial streams associated with the directional beam, where determining that the directional beam is associated with the communications in the shared radio frequency spectrum band that excludes the defined set of channel access procedures is based on the comparison.

Figure 13:
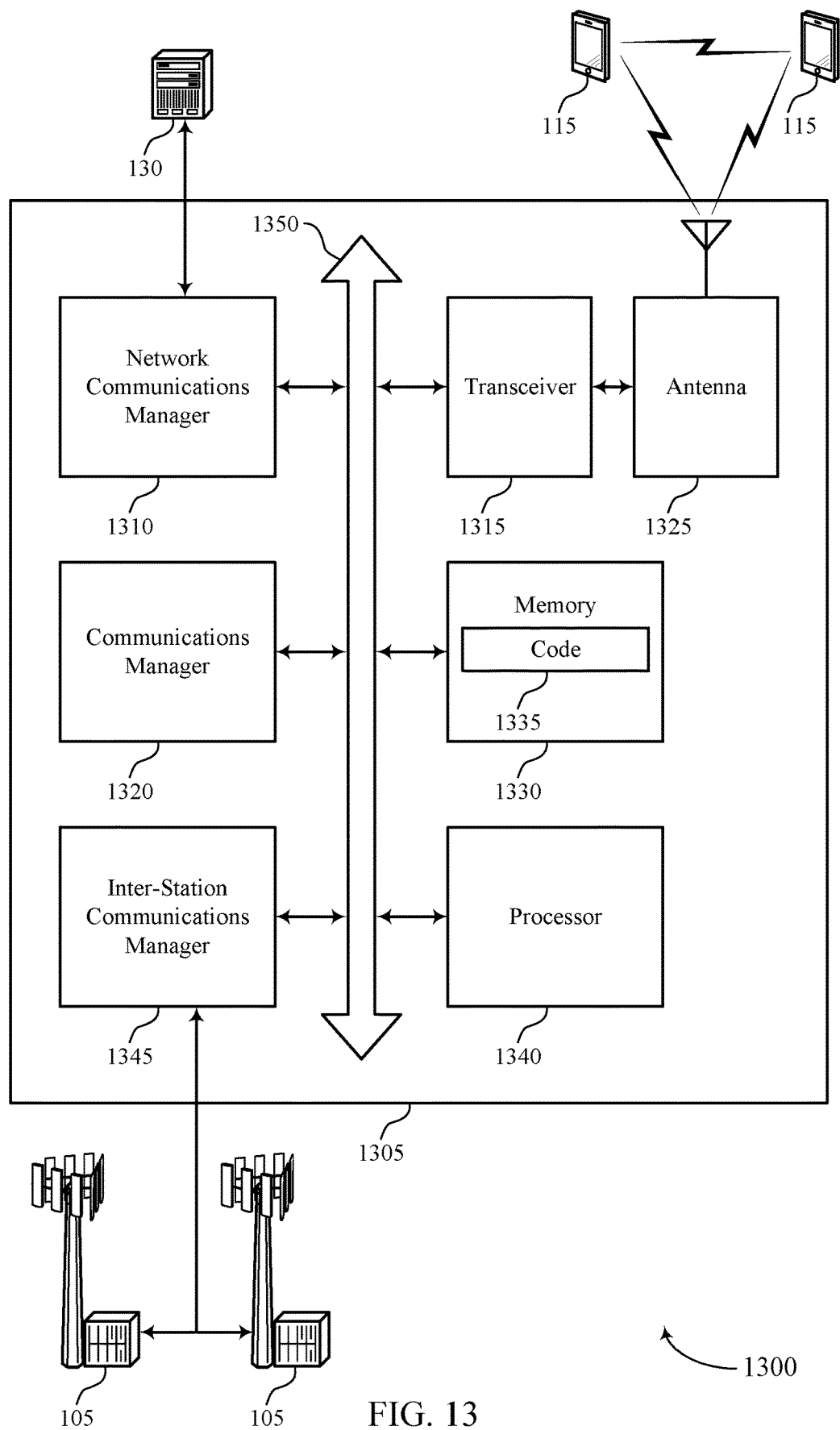
FIG. 13 shows a diagram of a system including a device that supports directional channel access using a narrow beam with multiple spatial streams in accordance with aspects of the present disclosure.

FIG. 13 shows a diagram of a system 1300 including a device 1305 that supports directional channel access using a narrow beam with multiple spatial streams in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting directional channel access using a narrow beam with multiple spatial streams). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a first wireless device in accordance with examples as disclosed herein. For example, the communications manager 1320 may be configured as or otherwise support a means for selecting a directional beam from a set of one or more directional beams for transmitting a message to a second wireless device in a shared radio frequency spectrum band. The communications manager 1320 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The communications manager 1320 may be configured as or otherwise support a means for transmitting, to the second wireless device, the message in the shared radio frequency spectrum band using the directional beam based on the determination.

Additionally or alternatively, the communications manager 1320 may support wireless communication at a first wireless device in accordance with examples as disclosed herein. For example, the communications manager 1320 may be configured as or otherwise support a means for selecting a directional beam from a set of one or more directional beams for receiving a message from a second wireless device in a shared radio frequency spectrum band. The communications manager 1320 may be configured as or otherwise support a means for determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The communications manager 1320 may be configured as or otherwise support a means for receiving, from the second wireless device, the message in the shared radio frequency spectrum band using the directional beam based on the determination.

By including or configuring the communications manager 1320 in accordance with examples as described herein, the device 1305 may support techniques for improved communication reliability, reduced latency, more efficient utilization of communication resources, improved coordination between devices, and enhanced communications efficiency while avoiding unnecessary interference to other devices when performing directional communication over a channel without performing channel access procedures.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of directional channel access using a narrow beam with multiple spatial streams as described herein, or the processor 1340 and the memory 1330 may be otherwise configured to perform or support such operations.

Figure 14:
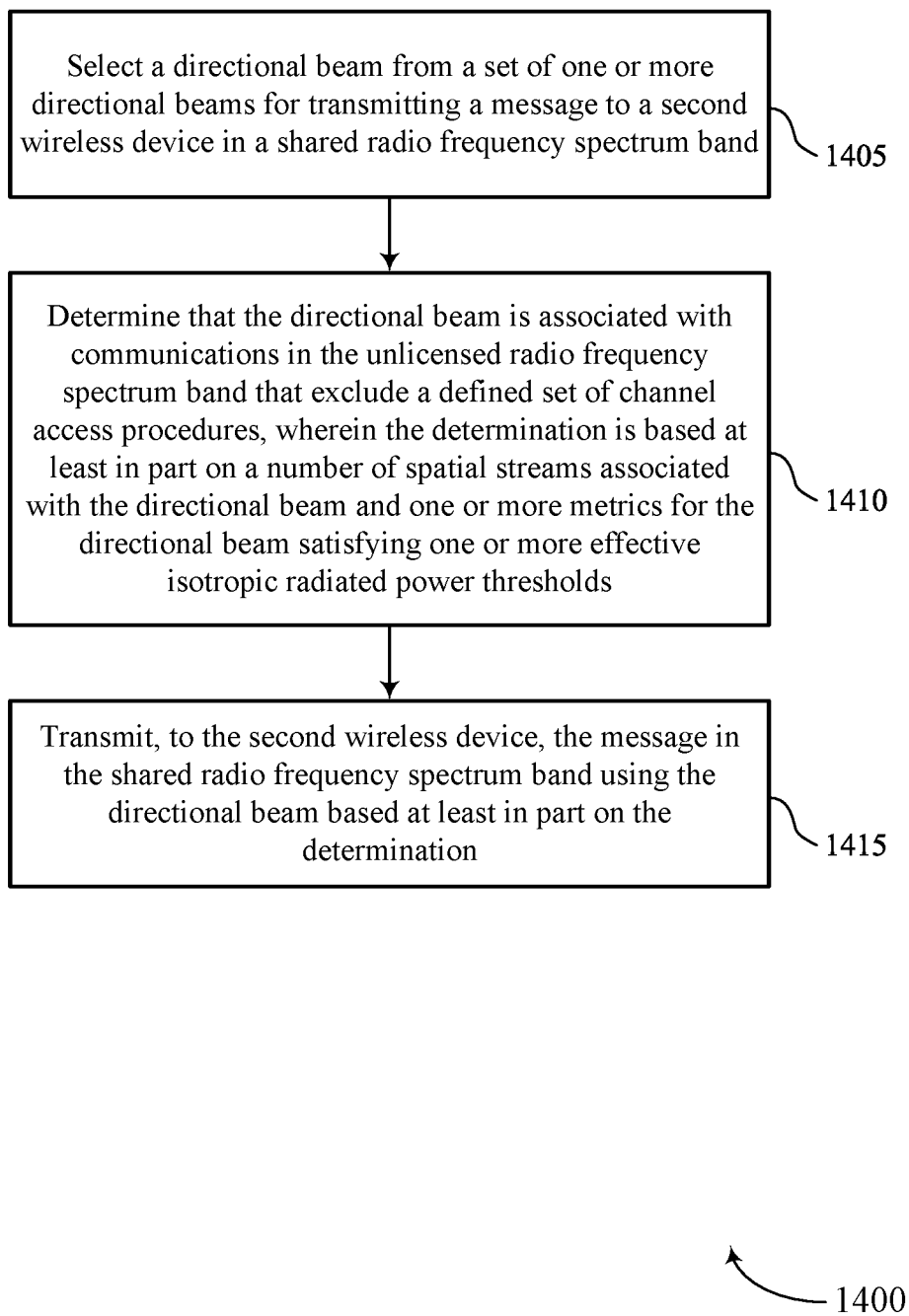
FIGS. 14 through 16 show flowcharts illustrating methods that support directional channel access using a narrow beam with multiple spatial streams in accordance with aspects of the present disclosure.

FIG. 14 shows a flowchart illustrating a method 1400 that supports directional channel access using a narrow beam with multiple spatial streams in accordance with aspects of the present disclosure. The operations of the method 1400 may be implemented by a UE or a base station or its components as described herein. For example, the operations of the method 1400 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include selecting a directional beam from a set of one or more directional beams for transmitting a message to a second wireless device in a shared radio frequency spectrum band. The operations of 1405 may be performed in accordance with examples as disclosed herein. In some examples, aspects of the operations of 1405 may be performed by a beam selection component 825 or a beam selection component 1225 as described with reference to FIGS. 8 and 12.

At 1410, the method may include determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The operations of 1410 may be performed in accordance with examples as disclosed herein. In some examples, aspects of the operations of 1410 may be performed by a beam determination component 830 or a beam determination component 1230 as described with reference to FIGS. 8 and 12.

At 1415, the method may include transmitting, to the second wireless device, the message in the shared radio frequency spectrum band using the directional beam based on the determination. The operations of 1415 may be performed in accordance with examples as disclosed herein. In some examples, aspects of the operations of 1415 may be performed by a beam transmitter 835 or a beam transmitter 1235 as described with reference to FIGS. 8 and 12.

Figure 15:
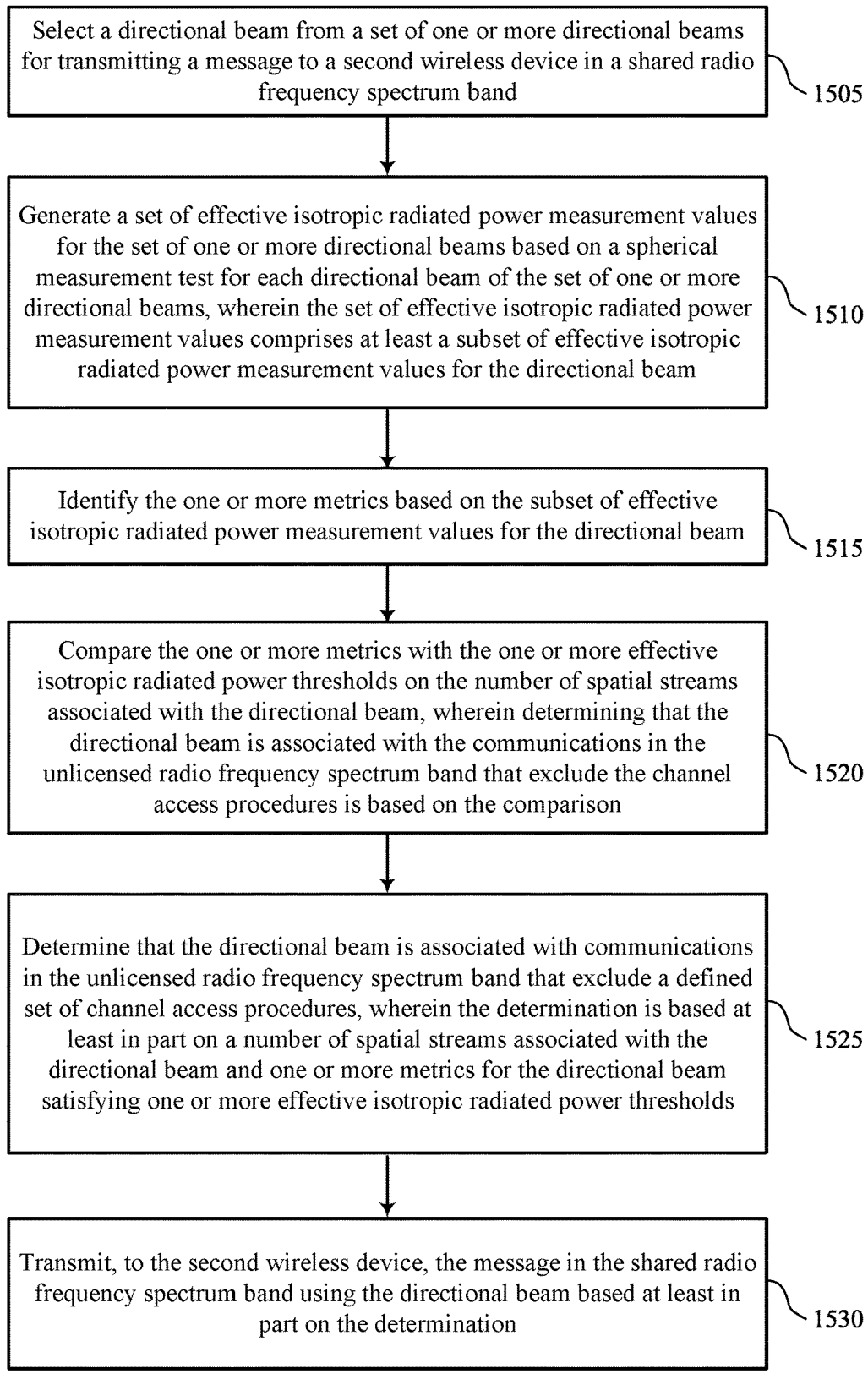

FIG. 15 shows a flowchart illustrating a method 1500 that supports directional channel access using a narrow beam with multiple spatial streams in accordance with aspects of the present disclosure. The operations of the method 1500 may be implemented by a UE or a base station or its components as described herein. For example, the operations of the method 1500 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include selecting a directional beam from a set of one or more directional beams for transmitting a message to a second wireless device in a shared radio frequency spectrum band. The operations of 1505 may be performed in accordance with examples as disclosed herein. In some examples, aspects of the operations of 1505 may be performed by a beam selection component 825 or a beam selection component 1225 as described with reference to FIGS. 8 and 12.

At 1510, the method may include generating a set of EIRP measurement values for the set of one or more directional beams based on a spherical measurement test for each directional beam of the set of one or more directional beams, where the set of EIRP measurement values includes at least a subset of EIRP measurement values for the directional beam. The operations of 1510 may be performed in accordance with examples as disclosed herein. In some examples, aspects of the operations of 1510 may be performed by a beam measurement component 840 or a beam measurement component 1245 as described with reference to FIGS. 8 and 12.

At 1515, the method may include identifying the one or more metrics based on the subset of EIRP measurement values for the directional beam. The operations of 1515 may be performed in accordance with examples as disclosed herein. In some examples, aspects of the operations of 1515 may be performed by a metric identification component 845 or a metric identification component 1250 as described with reference to FIGS. 8 and 12.

At 1520, the method may include comparing the one or more metrics with the one or more EIRP thresholds based on the number of spatial streams associated with the directional beam, where determining that the directional beam is associated with the communications in the shared radio frequency spectrum band that excludes the defined set of channel access procedures is based on the comparison. The operations of 1520 may be performed in accordance with examples as disclosed herein. In some examples, aspects of the operations of 1520 may be performed by a threshold component 850 or a threshold component 1255 as described with reference to FIGS. 8 and 12.

At 1525, the method may include determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The operations of 1525 may be performed in accordance with examples as disclosed herein. In some examples, aspects of the operations of 1525 may be performed by a beam determination component 830 or a beam determination component 1230 as described with reference to FIGS. 8 and 12.

At 1530, the method may include transmitting, to the second wireless device, the message in the shared radio frequency spectrum band using the directional beam based on the determination. The operations of 1530 may be performed in accordance with examples as disclosed herein. In some examples, aspects of the operations of 1530 may be performed by a beam transmitter 835 or a beam transmitter 1235 as described with reference to FIGS. 8 and 12.

Figure 16:
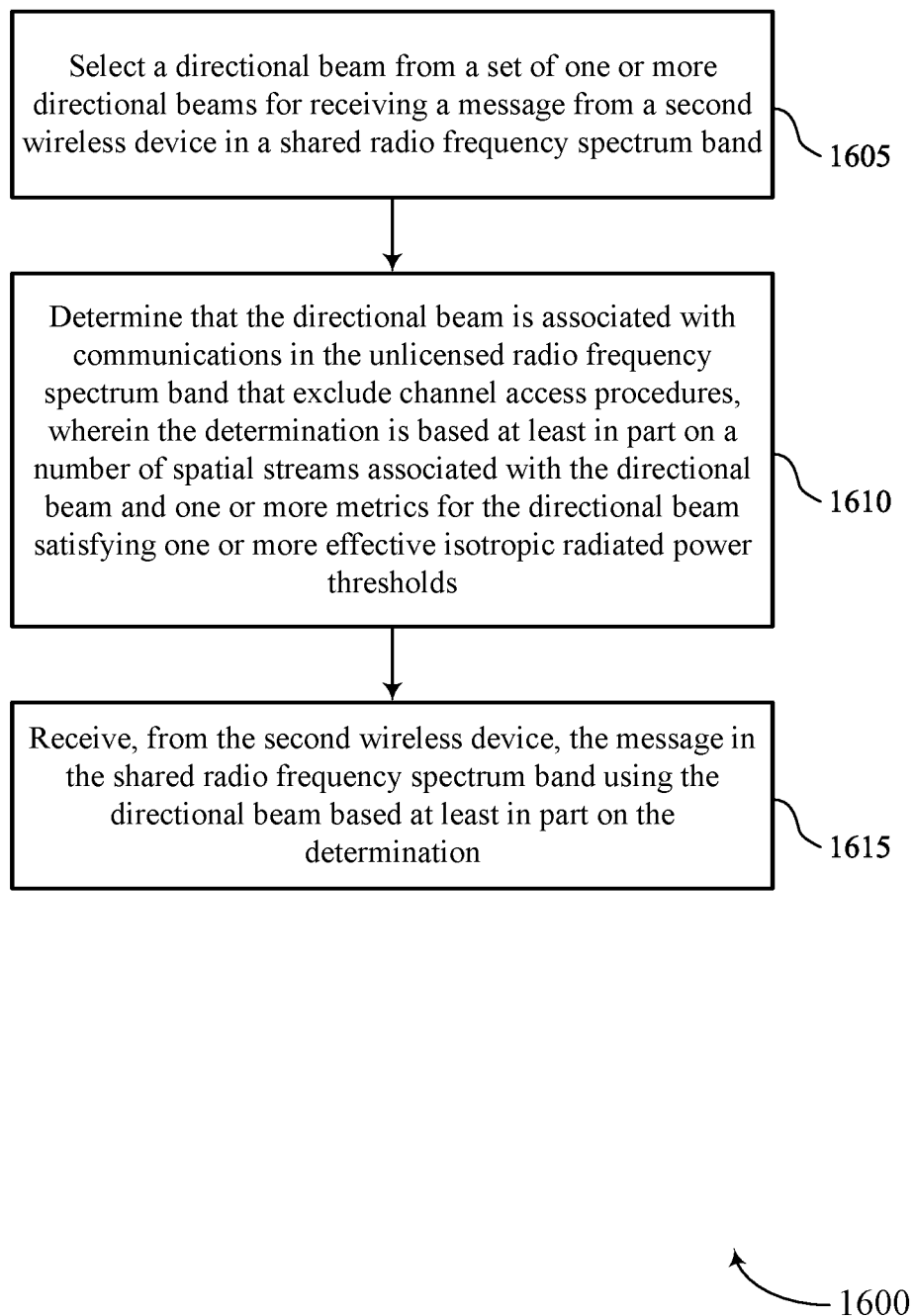

FIG. 16 shows a flowchart illustrating a method 1600 that supports directional channel access using a narrow beam with multiple spatial streams in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include selecting a directional beam from a set of one or more directional beams for receiving a message from a second wireless device in a shared radio frequency spectrum band. The operations of 1605 may be performed in accordance with examples as disclosed herein. In some examples, aspects of the operations of 1605 may be performed by a beam selection component 1225 as described with reference to FIG. 12.

At 1610, the method may include determining that the directional beam is associated with communications in the shared radio frequency spectrum band that exclude a defined set of channel access procedures, where the determination is based on a number of spatial streams associated with the directional beam and one or more metrics for the directional beam satisfying one or more EIRP thresholds. The operations of 1610 may be performed in accordance with examples as disclosed herein. In some examples, aspects of the operations of 1610 may be performed by a beam determination component 1230 as described with reference to FIG. 12.

At 1615, the method may include receiving, from the second wireless device, the message in the shared radio frequency spectrum band using the directional beam based on the determination. The operations of 1615 may be performed in accordance with examples as disclosed herein. In some examples, aspects of the operations of 1615 may be performed by a beam receiver 1240 as described with reference to FIG. 12.

The following provides an overview of aspects of the present disclosure:

Aspect 1: A method for wireless communication at a first wireless device, comprising: selecting a directional beam from a set of one or more directional beams for transmitting a message to a second wireless device in a shared radio frequency spectrum band; determining that the directional beam is associated with communications in the shared radio frequency spectrum band that exclude a defined set of channel access procedures, wherein the determination is based at least in part on a number of spatial streams associated with the directional beam and one or more metrics for the directional beam satisfying one or more effective isotropic radiated power thresholds; and transmitting, to the second wireless device, the message in the shared radio frequency spectrum band using the directional beam based at least in part on the determination.

Aspect 2: The method of aspect 1, further comprising: generating a set of effective isotropic radiated power measurement values for the set of one or more directional beams based at least in part on a spherical measurement test for each directional beam of the set of one or more directional beams, wherein the set of effective isotropic radiated power measurement values comprises at least a subset of effective isotropic radiated power measurement values for the directional beam; identifying the one or more metrics based at least in part on the subset of effective isotropic radiated power measurement values for the directional beam; and comparing the one or more metrics with the one or more effective isotropic radiated power thresholds based at least in part on the number of spatial streams associated with the directional beam, wherein determining that the directional beam is associated with the communications in the shared radio frequency spectrum band that excludes the defined set of channel access procedures is based at least in part on the comparison.

Aspect 3: The method of aspect 2, wherein identifying the one or more metrics for the directional beam comprises: identifying a first metric of the one or more metrics based at least in part on a difference between a first effective isotropic radiated power measurement value and a second effective isotropic radiated power measurement value from the subset of effective isotropic radiated power measurement values, wherein the first effective isotropic radiated power measurement value corresponds to a first percentile of effective isotropic radiated power measurements for the directional beam and the second effective isotropic radiated power measurement value corresponds to a second percentile of effective isotropic radiated power measurements for the directional beam.

Aspect 4: The method of aspect 3, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the first metric being greater than or equal to at least one effective isotropic radiated power threshold of the one or more effective isotropic radiated power thresholds based at least in part on the number of spatial streams.

Aspect 5: The method of aspect 4, wherein the number of spatial streams does not satisfy a threshold number of spatial streams, and the first wireless device operates in accordance with a device-based power limitation or an antenna port-based power limitation, or any combination thereof.

Aspect 6: The method of any of aspects 3 through 5, wherein the first metric is based at least in part on a reference precoder associated with generating the directional beam, the reference precoder being from a set of one or more predefined reference precoders, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the first metric being greater than a first effective isotropic radiated power threshold of the one or more effective isotropic radiated power thresholds based at least in part on the reference precoder.

Aspect 7: The method of any of aspects 3 through 6, wherein the first percentile is greater than the second percentile.

Aspect 8: The method of any of aspects 2 through 7, wherein identifying the one or more metrics for the directional beam comprises: identifying a second metric of the one or more metrics based at least in part on a third effective isotropic radiated power measurement value that corresponds to a predefined percentile of effective isotropic radiated power measurements for the directional beam.

Aspect 9: The method of aspect 8, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the second metric being less than or equal to at least one effective isotropic radiated power threshold of the one or more effective isotropic radiated power thresholds based at least in part on the number of spatial streams.

Aspect 10: The method of aspect 9, wherein the number of spatial streams does not satisfy a threshold number of spatial streams, and the first wireless device operates in accordance with a device-based power limitation or an antenna port-based power limitation, or any combination thereof.

Aspect 11: The method of any of aspects 8 through 10, wherein the second metric is based at least in part on a reference precoder associated with generating the directional beam, the reference precoder being from a set of one or more predefined reference precoders, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the second metric being less than a second effective isotropic radiated power threshold of the one or more effective isotropic radiated power thresholds based at least in part on the reference precoder.

Aspect 12: The method of any of aspects 8 through 11, wherein the second metric is identified based at least in part on a transmission power value.

Aspect 13: The method of any of aspects 2 through 12, wherein determining that the directional beam is associated with the communications in the shared radio frequency spectrum band that excludes the defined set of channel access procedures comprises: identifying a threshold number of spatial streams associated with the directional beam; comparing the number of spatial streams with the threshold number of spatial streams; and determining that the directional beam is associated with the communications in the shared radio frequency spectrum band that excludes the defined set of channel access procedures based at least in part on the number of spatial streams satisfying the threshold number of spatial streams.

Aspect 14: The method of any of aspects 2 through 13, wherein performing the spherical measurement test comprises: forming each directional beam of the set of one or more directional beams, wherein each directional beam is formed using a single spatial stream; measuring a plurality of effective isotropic radiated power measurement values for each directional beam of the set of one or more directional beams, the plurality of effective isotropic radiated power measurement values comprising respective effective isotropic radiated power measurement values for each direction of a plurality of directions; and recording the set of effective isotropic radiated power measurement values for the set of one or more directional beams comprising a subset of effective isotropic radiated power measurement values for each directional beam based at least in part on the plurality of effective isotropic radiated power measurement values.

Aspect 15: The method of aspect 14, wherein each directional beam of the set of one or more directional beams are formed based at least in part on a predetermined beamforming codebook.

Aspect 16: The method of any of aspects 14 through 15, wherein each direction of the plurality of directions comprises a non-uniform azimuth and a non-uniform elevation, and each effective isotropic radiated power measurement value of the set of effective isotropic radiated power measurement values is associated with an azimuth value and an elevation value.

Aspect 17: The method of any of aspects 14 through 16, wherein each direction of the plurality of directions comprises a uniform azimuth and a uniform elevation, and each effective isotropic radiated power measurement value of the set of effective isotropic radiated power measurement values is associated with an azimuth value and an elevation value.

Aspect 18: The method of any of aspects 2 through 17, wherein performing the spherical measurement test comprises: forming each directional beam of the set of one or more directional beams based at least in part on a reference precoder from a set of reference precoders, wherein each directional beam is formed using multiple spatial streams; measuring a plurality of effective isotropic radiated power measurement values for each directional beam of the set of one or more directional beams and for each reference precoder from the set of reference precoders, the plurality of effective isotropic radiated power measurement values comprising respective effective isotropic radiated power measurement values for each direction of a plurality of directions; and recording the set of effective isotropic radiated power measurement values for the set of one or more directional beams comprising a subset of effective isotropic radiated power measurement values for each directional beam based at least in part on the plurality of effective isotropic radiated power measurement values.

Aspect 19: The method of aspect 18, wherein each directional beam of the set of one or more directional beams are formed based at least in part on a predetermined analog beamforming codebook and a predefined digital precoding codebook.

Aspect 20: The method of any of aspects 18 through 19, wherein each direction of the plurality of directions comprises a non-uniform azimuth and a non-uniform elevation, and each effective isotropic radiated power measurement value of the set of effective isotropic radiated power measurement values is associated with an azimuth value and an elevation value.

Aspect 21: The method of any of aspects 18 through 19, wherein each direction of the plurality of directions comprises a uniform azimuth and a uniform elevation, and each effective isotropic radiated power measurement value of the set of effective isotropic radiated power measurement values is associated with an azimuth value and an elevation value.

Aspect 22: The method of any of aspects 18 through 21, wherein the set of reference precoders is based at least in part on a number of columns selected from an orthonormal matrix, the number of columns being based at least in part on a number of antenna ports and the multiple spatial streams.

Aspect 23: The method of any of aspects 1 through 22, further comprising: determining the one or more effective isotropic radiated power thresholds based at least in part on the number of spatial streams and one or more parameters associated with a power limitation at the first wireless device.

Aspect 24: The method of aspect 23, wherein the power limitation comprises a device-based power limitation, and a first effective isotropic radiated power threshold associated with a first number of spatial streams is less than a second effective isotropic radiated power threshold associated with a second number of spatial streams, the first number of spatial streams being greater than the second number of spatial streams.

Aspect 25: The method of any of aspects 23 through 24, wherein the one or more parameters associated with the power limitation are associated with a device-based power threshold or an antenna port-based power threshold, and a first effective isotropic radiated power threshold associated with a first number of spatial streams is greater than a second effective isotropic radiated power threshold associated with a second number of spatial streams, the first number of spatial streams being greater than the second number of spatial streams.

Aspect 26: The method of any of aspects 1 through 25, further comprising: refraining from performing the channel access procedures prior to transmitting the message based at least in part on determining that the directional beam is associated with the communications in the shared radio frequency spectrum band that excludes the defined set of channel access procedures, the channel access procedures comprising one or more listen-before-talk procedures.

Aspect 27: A method for wireless communication at a first wireless device, comprising: selecting a directional beam from a set of one or more directional beams for receiving a message from a second wireless device in a shared radio frequency spectrum band; determining that the directional beam is associated with communications in the shared radio frequency spectrum band that exclude a defined set of channel access procedures, wherein the determination is based at least in part on a number of spatial streams associated with the directional beam and one or more metrics for the directional beam satisfying one or more effective isotropic radiated power thresholds; and receiving, from the second wireless device, the message in the shared radio frequency spectrum band using the directional beam based at least in part on the determination.

Aspect 28: The method of aspect 27, further comprising: generating a set of effective isotropic radiated power measurement values for the set of one or more directional beams based at least in part on a spherical measurement test for each directional beam of the set of one or more directional beams, wherein the set of effective isotropic radiated power measurement values comprises at least a subset of effective isotropic radiated power measurement values for the directional beam; identifying the one or more metrics based at least in part on the subset of effective isotropic radiated power measurement values for the directional beam; and comparing the one or more metrics with the one or more effective isotropic radiated power thresholds based at least in part on the number of spatial streams associated with the directional beam, wherein determining that the directional beam is associated with the communications in the shared radio frequency spectrum band that excludes the defined set of channel access procedures is based at least in part on the comparison.

Aspect 29: The method of aspect 28, wherein identifying the one or more metrics for the directional beam comprises: identifying a first metric of the one or more metrics based at least in part on a difference between a first effective isotropic radiated power measurement value and a second effective isotropic radiated power measurement value from the subset of effective isotropic radiated power measurement values, wherein the first effective isotropic radiated power measurement value corresponds to a first percentile of effective isotropic radiated power measurements for the directional beam and the second effective isotropic radiated power measurement value corresponds to a second percentile of effective isotropic radiated power measurements for the directional beam.

Aspect 30: The method of aspect 29, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the first metric being greater than or equal to at least one effective isotropic radiated power threshold of the one or more effective isotropic radiated power thresholds based at least in part on the number of spatial streams.

Aspect 31: The method of aspect 30, wherein the number of spatial streams does not satisfy a threshold number of spatial streams, and the first wireless device operates in accordance with a device-based power limitation or an antenna port-based power limitation, or any combination thereof.

Aspect 32: The method of any of aspects 29 through 31, wherein the first metric is based at least in part on a reference precoder associated with generating the directional beam, the reference precoder being from a set of one or more predefined reference precoders, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the first metric being greater than a first effective isotropic radiated power threshold of the one or more effective isotropic radiated power thresholds based at least in part on the reference precoder.

Aspect 33: The method of any of aspects 29 through 32, wherein the first percentile is greater than the second percentile.

Aspect 34: The method of any of aspects 28 through 33, wherein identifying the one or more metrics for the directional beam comprises: identifying a second metric of the one or more metrics based at least in part on a third effective isotropic radiated power measurement value that corresponds to a predefined percentile of effective isotropic radiated power measurements for the directional beam.

Aspect 35: The method of aspect 34, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the second metric being less than or equal to at least one effective isotropic radiated power threshold of the one or more effective isotropic radiated power thresholds based at least in part on the number of spatial streams.

Aspect 36: The method of aspect 35, wherein the number of spatial streams does not satisfy a threshold number of spatial streams, and the first wireless device operates in accordance with a device-based power limitation or an antenna port-based power limitation, or any combination thereof.

Aspect 37: The method of any of aspects 34 through 36, wherein the second metric is based at least in part on a reference precoder associated with generating the directional beam, the reference precoder being from a set of one or more predefined reference precoders, wherein determining that the directional beam is associated with the communications in the shared radio frequency spectrum band that excludes the defined set of channel access procedures comprises: determining that the directional beam is associated with the communications in the shared radio frequency spectrum band that excludes the defined set of channel access procedures based at least in part on the second metric being less than a second effective isotropic radiated power threshold of the one or more effective isotropic radiated power thresholds based at least in part on the reference precoder.

Aspect 38: The method of any of aspects 34 through 37, wherein the second metric is identified based at least in part on a transmission power value.

Aspect 39: The method of any of aspects 28 through 38, wherein determining that the directional beam is associated with the communications in the shared radio frequency spectrum band that excludes the defined set of channel access procedures comprises: identifying a threshold number of spatial streams associated with the directional beam; comparing the number of spatial streams with the threshold number of spatial streams; and determining that the directional beam is associated with the communications in the shared radio frequency spectrum band that excludes the defined set of channel access procedures based at least in part on the number of spatial streams satisfying the threshold number of spatial streams.

Aspect 40: The method of any of aspects 28 through 39, wherein performing the spherical measurement test comprises: forming each directional beam of the set of one or more directional beams, wherein each directional beam is formed using a single spatial stream; measuring a plurality of effective isotropic radiated power measurement values for each directional beam of the set of one or more directional beams, the plurality of effective isotropic radiated power measurement values comprising respective effective isotropic radiated power measurement values for each direction of a plurality of directions; and recording the set of effective isotropic radiated power measurement values for the set of one or more directional beams comprising a subset of effective isotropic radiated power measurement values for each directional beam based at least in part on the plurality of effective isotropic radiated power measurement values.

Aspect 41: The method of aspect 40, wherein each directional beam of the set of one or more directional beams are formed based at least in part on a predetermined beamforming codebook.

Aspect 42: The method of any of aspects 40 through 41, wherein each direction of the plurality of directions comprises a non-uniform azimuth and a non-uniform elevation, and each effective isotropic radiated power measurement value of the set of effective isotropic radiated power measurement values is associated with an azimuth value and an elevation value.

Aspect 43: The method of any of aspects 40 through 42, wherein each direction of the plurality of directions comprises a uniform azimuth and a uniform elevation, and each effective isotropic radiated power measurement value of the set of effective isotropic radiated power measurement values is associated with an azimuth value and an elevation value.

Aspect 44: The method of any of aspects 28 through 43, wherein performing the spherical measurement test comprises: forming each directional beam of the set of one or more directional beams based at least in part on a reference precoder from a set of reference precoders, wherein each directional beam is formed using multiple spatial streams; measuring a plurality of effective isotropic radiated power measurement values for each directional beam of the set of one or more directional beams and for each reference precoder from the set of reference precoders, the plurality of effective isotropic radiated power measurement values comprising respective effective isotropic radiated power measurement values for each direction of a plurality of directions; and recording the set of effective isotropic radiated power measurement values for the set of one or more directional beams comprising a subset of effective isotropic radiated power measurement values for each directional beam based at least in part on the plurality of effective isotropic radiated power measurement values.

Aspect 45: The method of aspect 44, wherein each directional beam of the set of one or more directional beams are formed based at least in part on a predetermined analog beamforming codebook and a predefined digital precoding codebook.

Aspect 46: The method of any of aspects 44 through 45, wherein each direction of the plurality of directions comprises a non-uniform azimuth and a non-uniform elevation, and each effective isotropic radiated power measurement value of the set of effective isotropic radiated power measurement values is associated with an azimuth value and an elevation value.

Aspect 47: The method of any of aspects 44 through 45, wherein each direction of the plurality of directions comprises a uniform azimuth and a uniform elevation, and each effective isotropic radiated power measurement value of the set of effective isotropic radiated power measurement values is associated with an azimuth value and an elevation value.

Aspect 48: The method of any of aspects 44 through 47, wherein the set of reference precoders is based at least in part on a number of columns selected from an orthonormal matrix, the number of columns being based at least in part on a number of antenna ports and the multiple spatial streams.

Aspect 49: The method of any of aspects 27 through 48, further comprising: determining the one or more effective isotropic radiated power thresholds based at least in part on the number of spatial streams and one or more parameters associated with a power limitation at the first wireless device.

Aspect 50: The method of aspect 49, wherein the power limitation comprises a device-based power limitation, and a first effective isotropic radiated power threshold associated with a first number of spatial streams is less than a second effective isotropic radiated power threshold associated with a second number of spatial streams, the first number of spatial streams being greater than the second number of spatial streams.

Aspect 51: The method of any of aspects 49 through 50, wherein the one or more parameters associated with the power limitation are associated with a device-based power threshold or an antenna port-based power threshold, and a first effective isotropic radiated power threshold associated with a first number of spatial streams is greater than a second effective isotropic radiated power threshold associated with a second number of spatial streams, the first number of spatial streams being greater than the second number of spatial streams.

Aspect 52: The method of any of aspects 27 through 51, further comprising: refraining from performing the channel access procedures prior to receiving the message based at least in part on determining that the directional beam is associated with the communications in the shared radio frequency spectrum band that excludes the defined set of channel access procedures, the channel access procedures comprising one or more listen-before-talk procedures.

Aspect 53: An apparatus for wireless communication at a first wireless device, comprising a processor; memory coupled with the processor; and instructions stored in the memory and executable by the processor to cause the apparatus to perform a method of any of aspects 1 through 26.

Aspect 54: An apparatus for wireless communication at a first wireless device, comprising at least one means for performing a method of any of aspects 1 through 26.

Aspect 55: A non-transitory computer-readable medium storing code for wireless communication at a first wireless device, the code comprising instructions executable by a processor to perform a method of any of aspects 1 through 26.

Aspect 56: An apparatus for wireless communication at a first wireless device, comprising a processor; memory coupled with the processor; and instructions stored in the memory and executable by the processor to cause the apparatus to perform a method of any of aspects 27 through 52.

Aspect 57: An apparatus for wireless communication at a first wireless device, comprising at least one means for performing a method of any of aspects 27 through 52.

Aspect 58: A non-transitory computer-readable medium storing code for wireless communication at a first wireless device, the code comprising instructions executable by a processor to perform a method of any of aspects 27 through 52.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
one or more memories storing processor-executable code; and
one or more processors coupled with the one or more memories and individually or collectively operable to execute the code to cause the first wireless device to:
select a directional beam from a set of one or more directional beams for transmitting a message to a second wireless device in a shared radio frequency spectrum band; and
transmit, to the second wireless device and using a quantity of spatial streams, the message in the shared radio frequency spectrum band via the directional beam, wherein the message is transmitted without sensing a channel based at least in part on the quantity of spatial streams and a first metric of one or more metrics associated with the selected directional beam being greater than a first threshold or based at least in part on the quantity of spatial streams and the first metric being less than a second threshold.

2. The first wireless device of claim 1, wherein the one or more processors are individually or collectively further operable to execute the code to cause the first wireless device to:
determine that the directional beam is associated with communication in the shared radio frequency spectrum band without channel sensing based at least in part on the first metric of the one or more metrics being greater than the first threshold and the quantity of spatial streams, wherein the message is transmitted using the quantity of spatial streams based at least in part on the first metric being greater than the first threshold.

3. The first wireless device of claim 2, wherein a value of the first threshold is based at least in part on a device-based power limitation of the first wireless device, or an antenna-port-based power limitation of the first wireless device, or both.

4. The first wireless device of claim 1, wherein the one or more processors are individually or collectively further operable to execute the code to cause the first wireless device to:
determine that the directional beam is associated with communication in the shared radio frequency spectrum band without channel sensing based at least in part on the first metric of the one or more metrics being less than the second threshold and the quantity of spatial streams, wherein the message is transmitted using the quantity of spatial streams based at least in part on the first metric being less than the second threshold.

5. The first wireless device of claim 4, wherein a value of the second threshold is based at least in part on a device-based power limitation of the first wireless device, or an antenna-port-based power limitation of the first wireless device, or both.

6. The first wireless device of claim 1, wherein the one or more processors are individually or collectively further operable to execute the code to cause the first wireless device to:
determine a threshold quantity of spatial streams based at least in part on the one or more metrics satisfying a threshold, wherein the message is transmitted using the threshold quantity of spatial streams.

7. The first wireless device of claim 1, wherein the one or more processors are individually or collectively further operable to execute the code to cause the first wireless device to:
determine that the directional beam is associated with communications in the shared radio frequency spectrum band that exclude channel sensing based at least in part on the quantity of spatial streams and a comparison of the one or more metrics satisfying with one or more effective isotropic radiated power thresholds, the one or more metrics being based at least in part on a set of effective isotropic radiated power measurement values for the set of one or more directional beams.

8. The first wireless device of claim 1, wherein the one or more metrics indicate a degree of narrowness of the directional beam.

9. The first wireless device of claim 1, wherein the one or more processors are individually or collectively further operable to execute the code to cause the first wireless device to:
refrain from sensing the channel based at least in part on the directional beam being associated with communications in the shared radio frequency spectrum band that exclude channel sensing.

10. The first wireless device of claim 1, wherein sensing the channel comprises one or more listen-before-talk procedures, one or more long-term sensing procedures, or any combination thereof.

11. A method for wireless communications at a first wireless device, comprising:
selecting a directional beam from a set of one or more directional beams for transmitting a message to a second wireless device in a shared radio frequency spectrum band; and
transmitting, to the second wireless device and using a quantity of spatial streams, the message in the shared radio frequency spectrum band via the directional beam, wherein the message is transmitted without sensing a channel based at least in part on the quantity of spatial streams and a first metric of one or more metrics associated with the selected directional beam being greater than a first threshold or based at least in part on the quantity of spatial streams and the first metric being less than a second threshold.

12. The method of claim 11, further comprising:
determining that the directional beam is associated with communication in the shared radio frequency spectrum band without channel sensing based at least in part on the first metric of the one or more metrics being greater than the first threshold and the quantity of spatial streams, wherein the message is transmitted using the quantity of spatial streams based at least in part on the first metric being greater than the first threshold.

13. The method of claim 12, wherein a value of the first threshold is based at least in part on a device-based power limitation of the first wireless device, or an antenna-port-based power limitation of the first wireless device, or both.

14. The method of claim 11, further comprising:
determining that the directional beam is associated with communication in the shared radio frequency spectrum band without channel sensing based at least in part on the first metric of the one or more metrics being less than the second threshold and the quantity of spatial streams, wherein the message is transmitted using the quantity of spatial streams based at least in part on the first metric being less than the second threshold.

15. The method of claim 14, wherein a value of the second threshold is based at least in part on a device-based power limitation of the first wireless device, or an antenna-port-based power limitation of the first wireless device, or both.

16. The method of claim 11, further comprising:
determining a threshold quantity of spatial streams based at least in part on the one or more metrics satisfying a threshold, wherein the message is transmitted using the threshold quantity of spatial streams.

17. The method of claim 11, further comprising:
determining that the directional beam is associated with communications in the shared radio frequency spectrum band that exclude channel sensing based at least in part on the quantity of spatial streams and a comparison of the one or more metrics satisfying with one or more effective isotropic radiated power thresholds, the one or more metrics being based at least in part on a set of effective isotropic radiated power measurement values for the set of one or more directional beams.

18. The method of claim 11, wherein the one or more metrics indicate a degree of narrowness of the directional beam.

19. The method of claim 11, further comprising:
refraining from sensing the channel based at least in part on the directional beam being associated with communications in the shared radio frequency spectrum band that exclude channel sensing.

20. A non-transitory computer-readable medium storing code for wireless communications, the code comprising instructions executable by one or more processors to:
select a directional beam from a set of one or more directional beams for transmitting a message to a second wireless device in a shared radio frequency spectrum band; and
transmit, to the second wireless device and using a quantity of spatial streams, the message in the shared radio frequency spectrum band via the directional beam, wherein the message is transmitted without sensing a channel based at least in part on the quantity of spatial streams and a first metric of one or more metrics associated with the selected directional beam being greater than a first threshold or based at least in part on the quantity of spatial streams and the first metric being less than a second threshold.

* * * * *